United States Patent
Kathuria et al.

(10) Patent No.: US 11,188,144 B2
(45) Date of Patent: Nov. 30, 2021

(54) METHOD AND APPARATUS TO NAVIGATE A VIRTUAL CONTENT DISPLAYED BY A VIRTUAL REALITY (VR) DEVICE

(71) Applicant: Samsung Electronics Co., Ltd., Suwon-si (KR)

(72) Inventors: Ashwani Kathuria, Noida (IN); Praveen Sonare, Noida (IN); Srinivas H. Kasal, Noida (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/956,904

(22) PCT Filed: Jan. 4, 2019

(86) PCT No.: PCT/KR2019/000150
§ 371 (c)(1),
(2) Date: Jun. 22, 2020

(87) PCT Pub. No.: WO2019/135634
PCT Pub. Date: Jul. 11, 2019

(65) Prior Publication Data
US 2020/0319704 A1    Oct. 8, 2020

(30) Foreign Application Priority Data
Jan. 5, 2018   (IN) .............................. 201811000625

(51) Int. Cl.
*G06F 3/01*       (2006.01)
*G06F 3/0346*     (2013.01)
(Continued)

(52) U.S. Cl.
CPC ............ *G06F 3/011* (2013.01); *G06F 3/0346* (2013.01); *G06F 3/03545* (2013.01); *G06T 19/003* (2013.01)

(58) Field of Classification Search
CPC . G06T 19/003; G06F 3/03545; G06F 3/0346; G06F 3/011
See application file for complete search history.

(56) References Cited

U.S. PATENT DOCUMENTS 6,009,210 A   12/1999   Kang
7,646,379 B1   1/2010   Drennan et al.
(Continued)

FOREIGN PATENT DOCUMENTS

KR   10-2011-0070514 A    6/2011
KR      10-1528480 B1     6/2015
(Continued)

OTHER PUBLICATIONS

International Search Report and Written Opinion dated Apr. 17, 2019, issued in International Application No. PCT/KR2019/00015.
(Continued)

*Primary Examiner* — Albert K Wong
(74) *Attorney, Agent, or Firm* — Jefferson IP Law, LLP

(57) ABSTRACT

A first device displays a first view of virtual content on the first device, establishes connection between the first device and a second device, receives movement data of the second device through the established connection, obtains at least one of direction information and rotation information based on the received movement data, and changes the first view to a second view corresponding to the obtained at least one of the direction information and the rotation information in the virtual content.

14 Claims, 13 Drawing Sheets

(a)

(b)

(c)

(d)

(51) Int. Cl.
*G06F 3/0354* (2013.01)
*G06T 19/00* (2011.01)

(56) References Cited

U.S. PATENT DOCUMENTS

| | | | |
|---|---|---|---|
| 7,893,935 B1 | 2/2011 | Neely, III et al. | |
| 9,285,589 B2* | 3/2016 | Osterhout | G06F 3/005 |
| 10,152,141 B1* | 12/2018 | Lohse | G06F 3/013 |
| 10,438,262 B1* | 10/2019 | Helmer | G09G 3/003 |
| 2001/0006383 A1 | 7/2001 | Fleck et al. | |
| 2004/0140963 A1 | 7/2004 | Kim et al. | |
| 2006/0028457 A1 | 2/2006 | Burns | |
| 2006/0105838 A1* | 5/2006 | Mullen | A63F 13/26 463/31 |
| 2010/0231581 A1 | 9/2010 | Shroads | |
| 2011/0009241 A1* | 1/2011 | Lane | A63B 24/0087 482/8 |
| 2012/0062445 A1* | 3/2012 | Haddick | G06K 9/00604 345/8 |
| 2014/0364212 A1* | 12/2014 | Osman | G06F 3/013 463/31 |
| 2015/0258431 A1* | 9/2015 | Stafford | A63F 13/5255 463/31 |
| 2015/0338933 A1 | 11/2015 | Holz et al. | |
| 2015/0352437 A1 | 12/2015 | Koseki et al. | |
| 2016/0026362 A1 | 1/2016 | Chavez et al. | |
| 2016/0232715 A1 | 8/2016 | Lee | |
| 2016/0267720 A1 | 9/2016 | Mandella et al. | |
| 2016/0357261 A1* | 12/2016 | Bristol | A63F 13/00 |
| 2017/0153741 A1 | 6/2017 | Ofek et al. | |
| 2017/0357332 A1* | 12/2017 | Balan | G02B 27/0093 |
| 2017/0358139 A1* | 12/2017 | Balan | G06F 3/0346 |
| 2018/0033204 A1* | 2/2018 | Dimitrov | G06F 3/04845 |
| 2018/0053056 A1* | 2/2018 | Rabinovich | A63F 13/211 |
| 2018/0096517 A1* | 4/2018 | Mallinson | G02B 27/0093 |
| 2018/0101247 A1* | 4/2018 | Lee | G06F 3/0346 |
| 2018/0107269 A1* | 4/2018 | Benzies | G06F 3/012 |
| 2019/0033988 A1* | 1/2019 | Hesch | G06T 7/74 |
| 2019/0034076 A1* | 1/2019 | Vinayak | G06T 19/006 |
| 2019/0187876 A1* | 6/2019 | Platt | G06F 3/0482 |
| 2019/0278993 A1* | 9/2019 | Hoover | G02B 27/017 |
| 2020/0134895 A1* | 4/2020 | Pollard | G06T 7/73 |
| 2020/0174262 A1* | 6/2020 | Godar | G06F 3/012 |
| 2020/0174552 A1* | 6/2020 | Stafford | A63F 13/213 |
| 2020/0226785 A1* | 7/2020 | Woods | G06T 7/277 |
| 2020/0238166 A1* | 7/2020 | Munson | G06F 3/0346 |
| 2020/0311403 A1* | 10/2020 | Raghoebardajal | G02B 27/017 |
| 2020/0316462 A1* | 10/2020 | Raghoebardajal | A63F 13/26 |
| 2020/0326544 A1* | 10/2020 | Wan | G06F 3/0346 |
| 2020/0388177 A1* | 12/2020 | Recker | G06F 3/011 |
| 2020/0400856 A1* | 12/2020 | Castleman | G01V 3/38 |
| 2020/0409481 A1* | 12/2020 | Henrikson | G06F 3/011 |

FOREIGN PATENT DOCUMENTS

| | | |
|---|---|---|
| KR | 10-2018-0000009 A | 1/2018 |
| WO | 2015/112359 A1 | 7/2015 |

OTHER PUBLICATIONS

Indian Office Action dated Aug. 25, 2020, issued in Indian Patent Application No. 201811000625.

* cited by examiner

[Fig. 1]
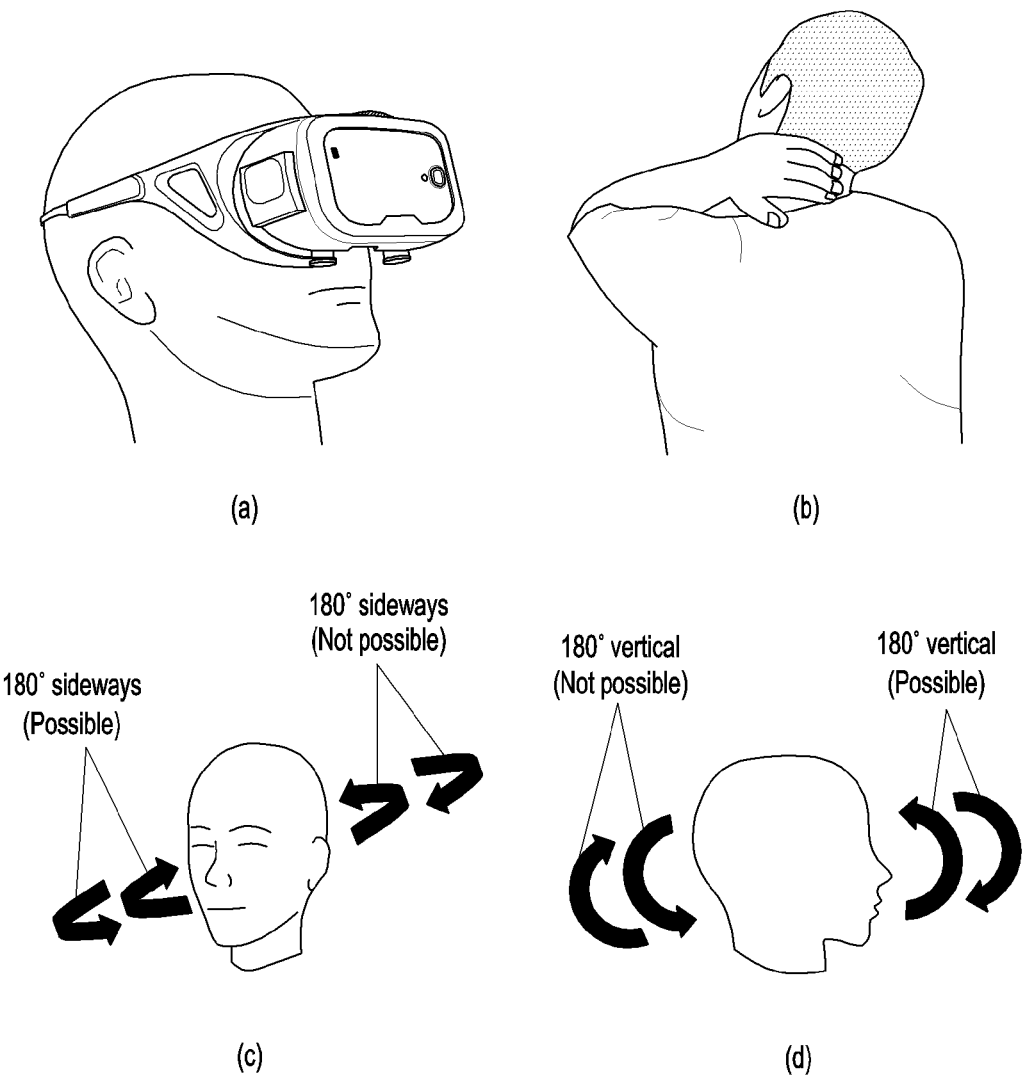

[Fig. 2]
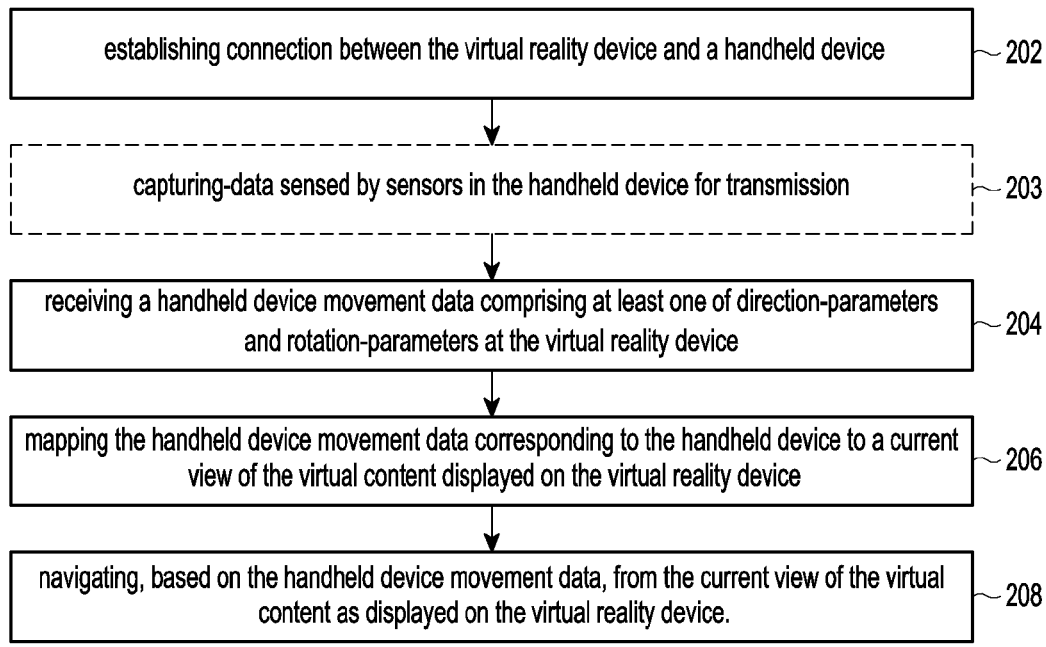
[Fig. 3]
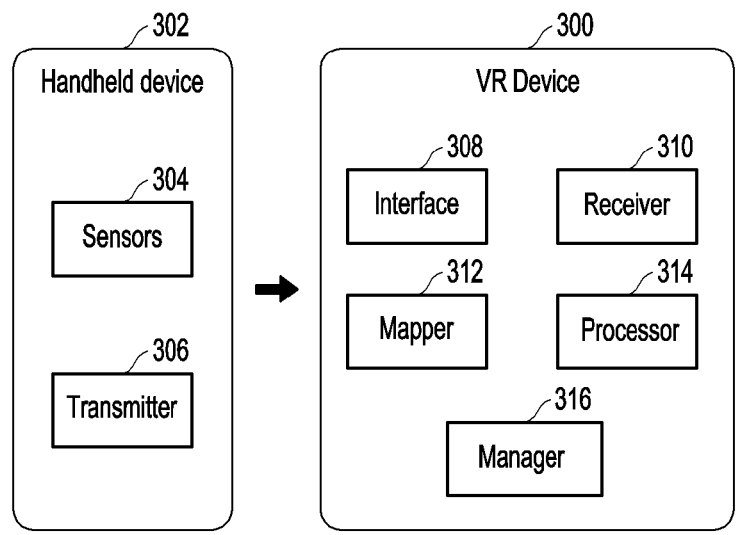

[Fig. 4]
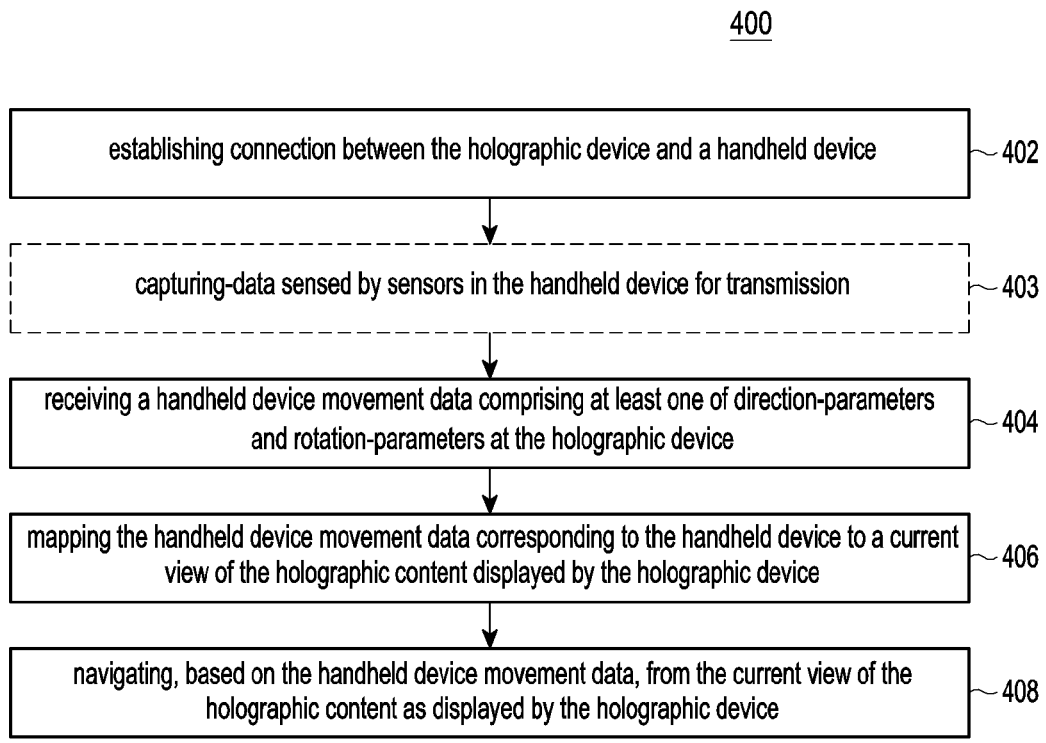
[Fig. 5]
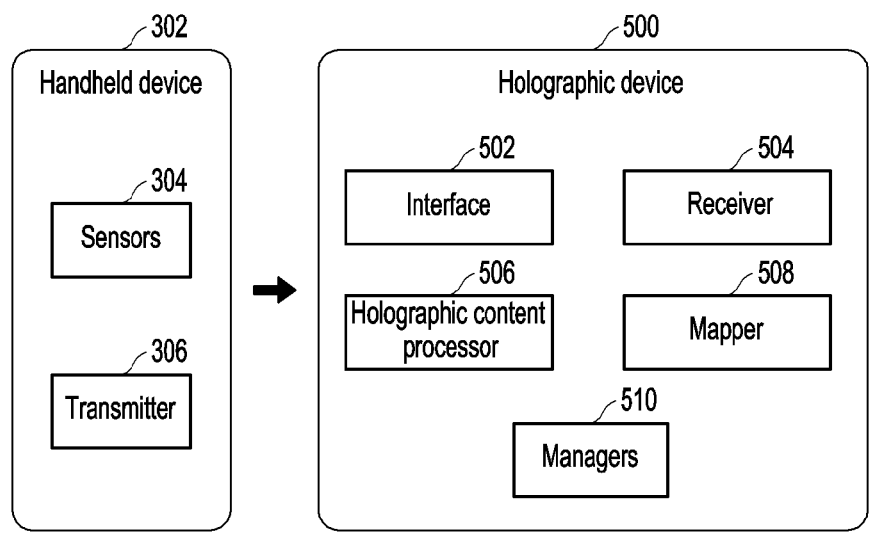

[Fig. 6]
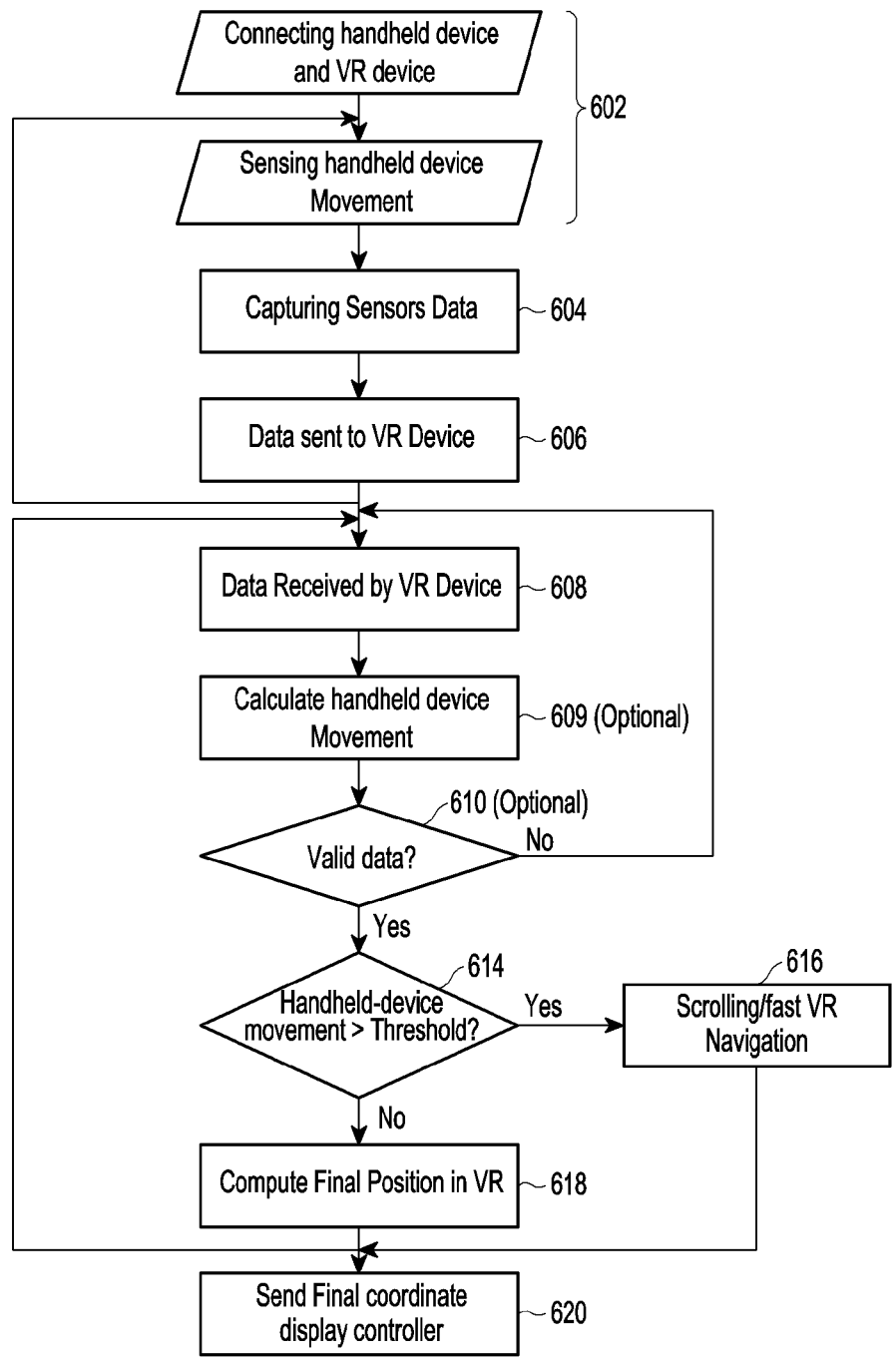

[Fig. 7]
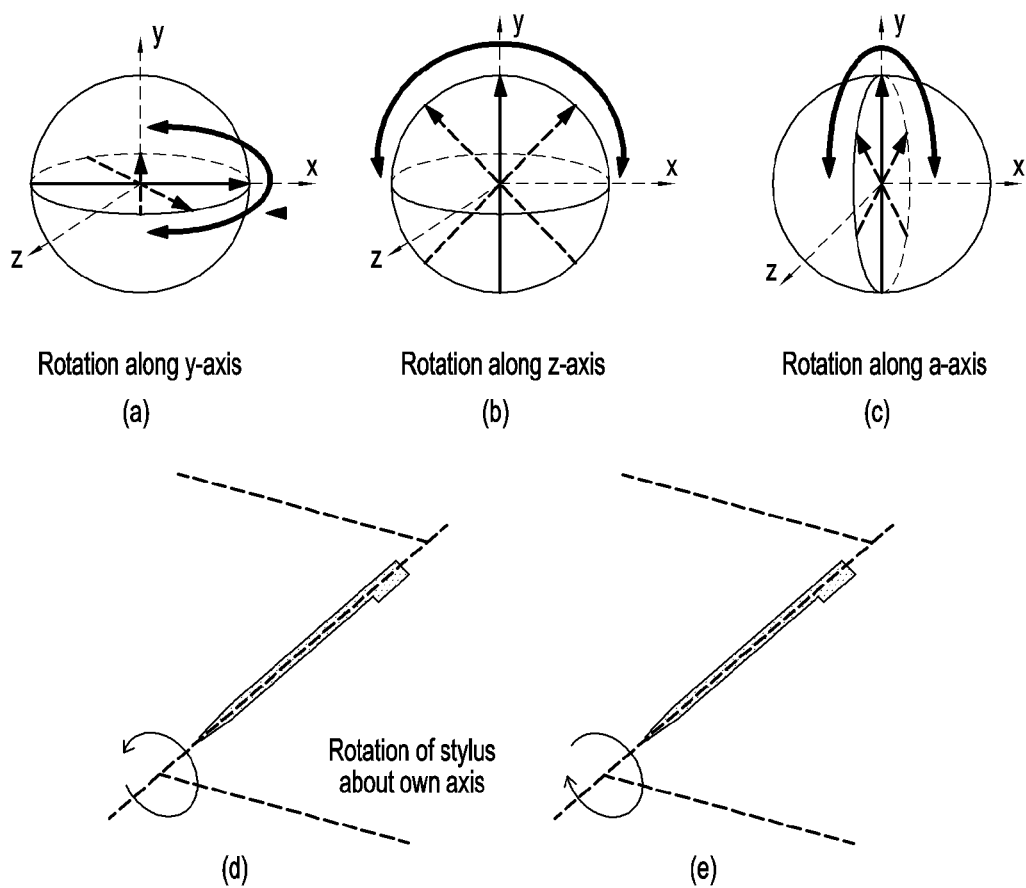

[Fig. 8]
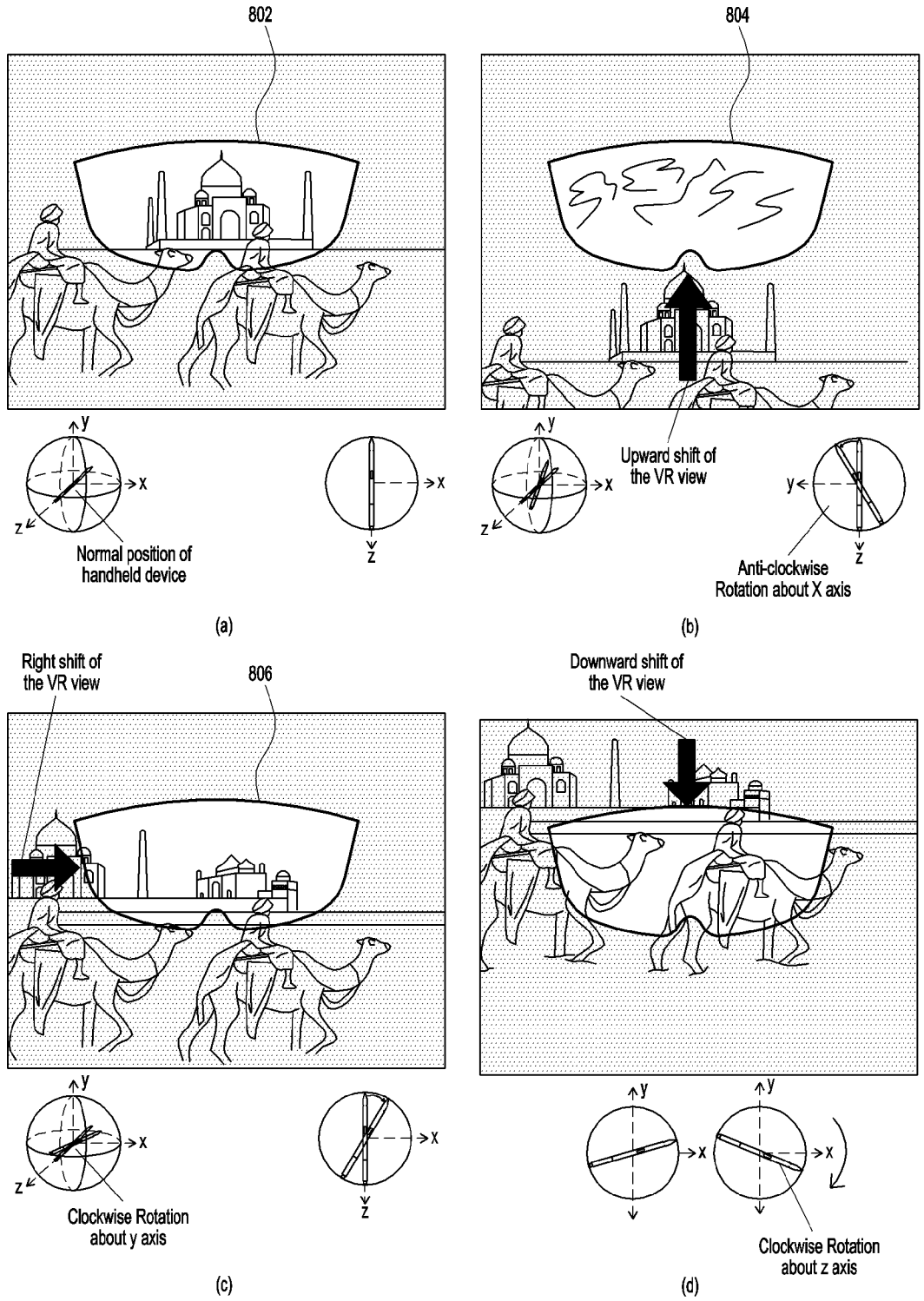

[Fig. 9]
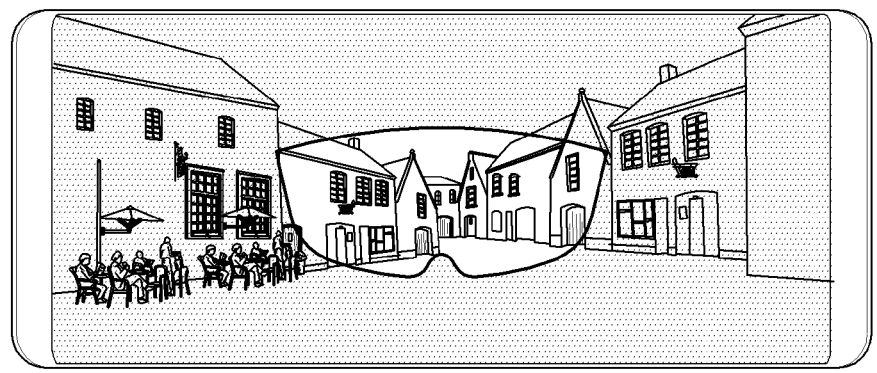
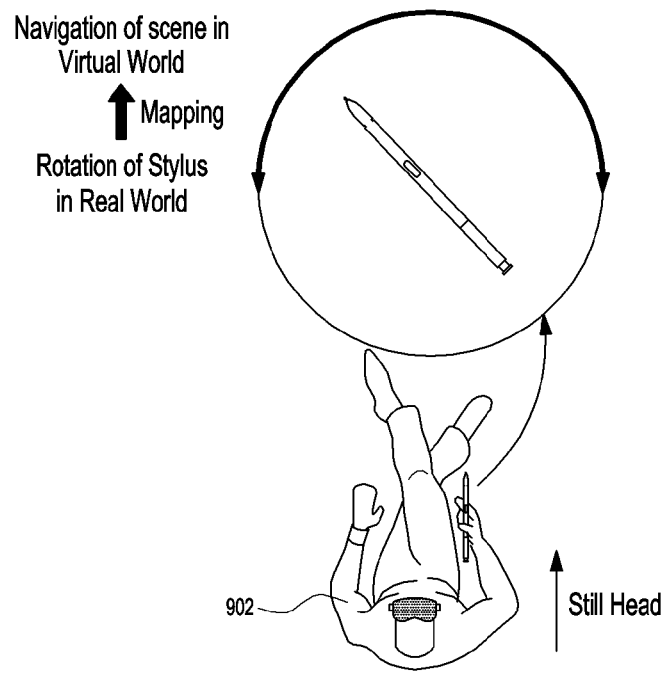

[Fig. 10]
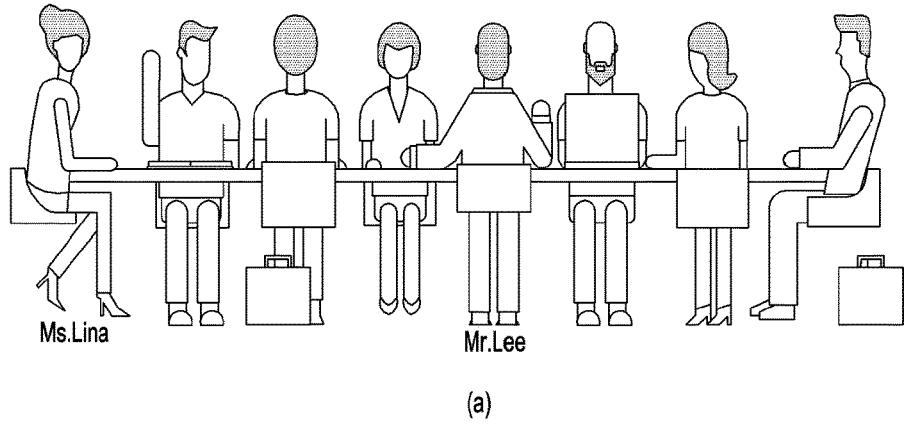
(a)
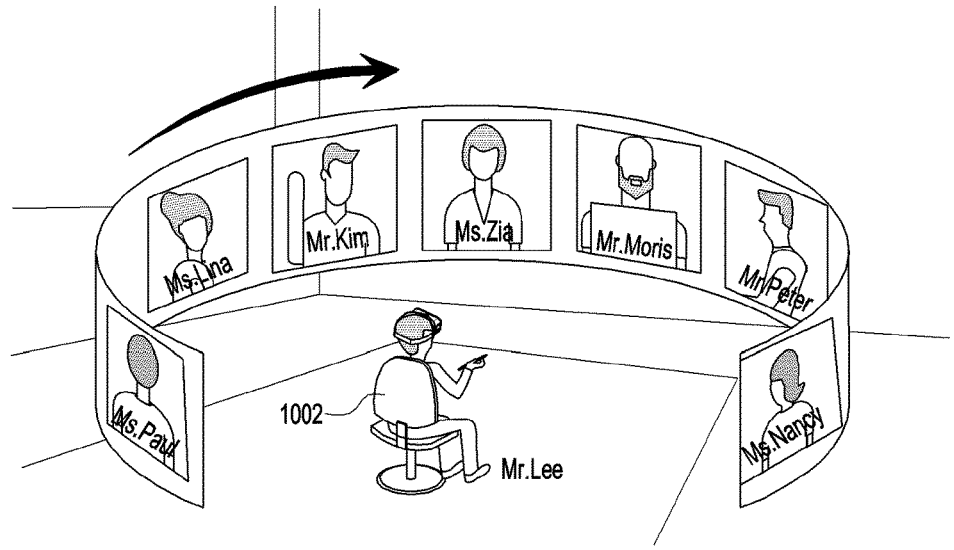
(b)
[Fig. 11]
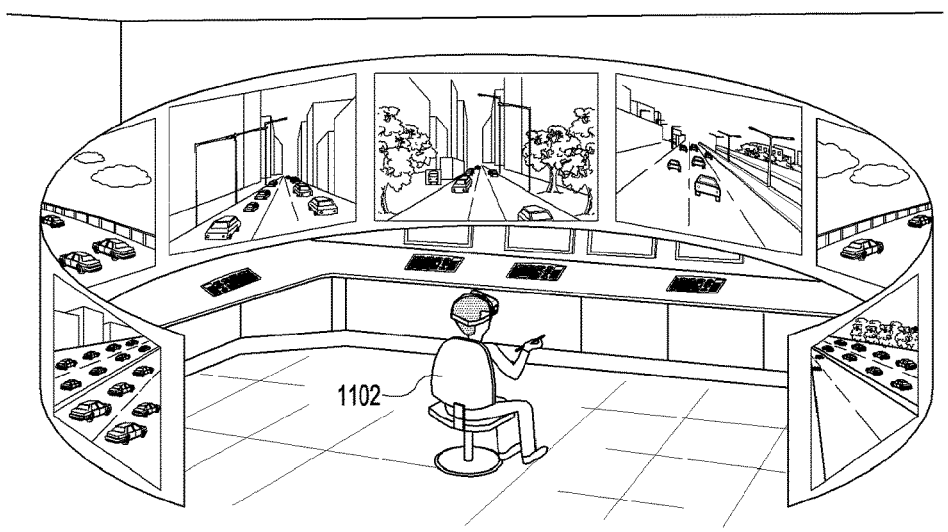

[Fig. 12]
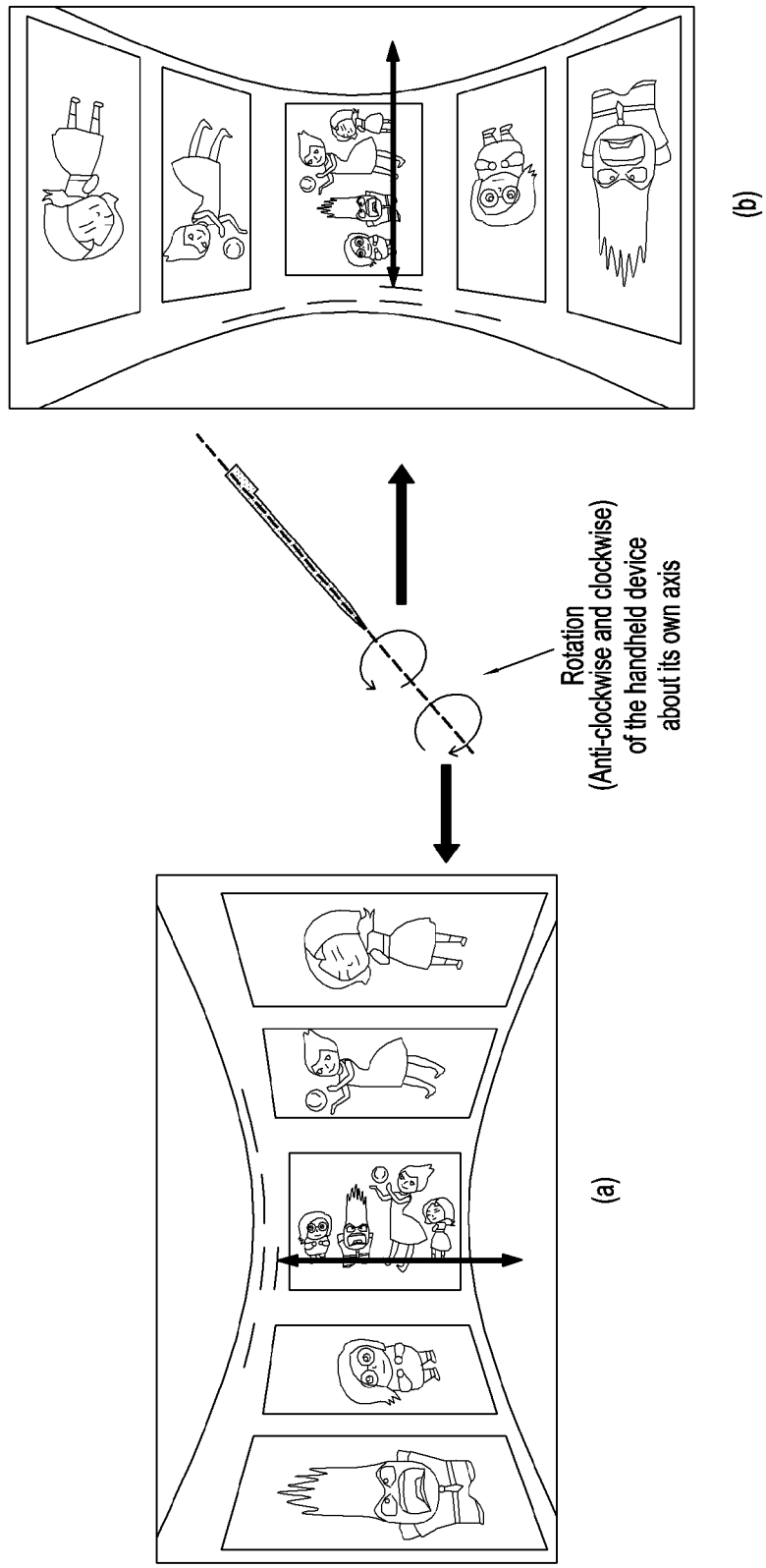

[Fig. 13]
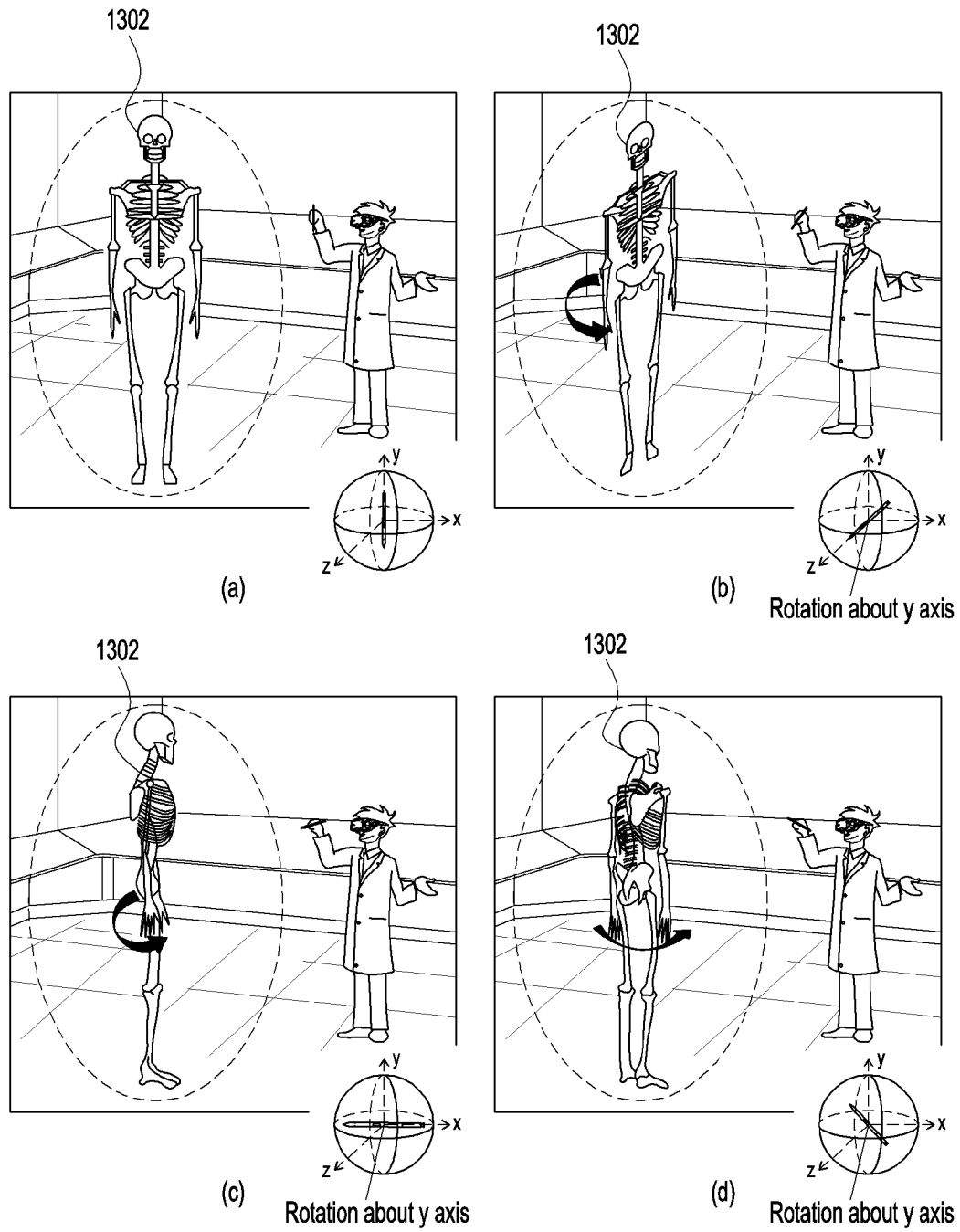

[Fig. 14]
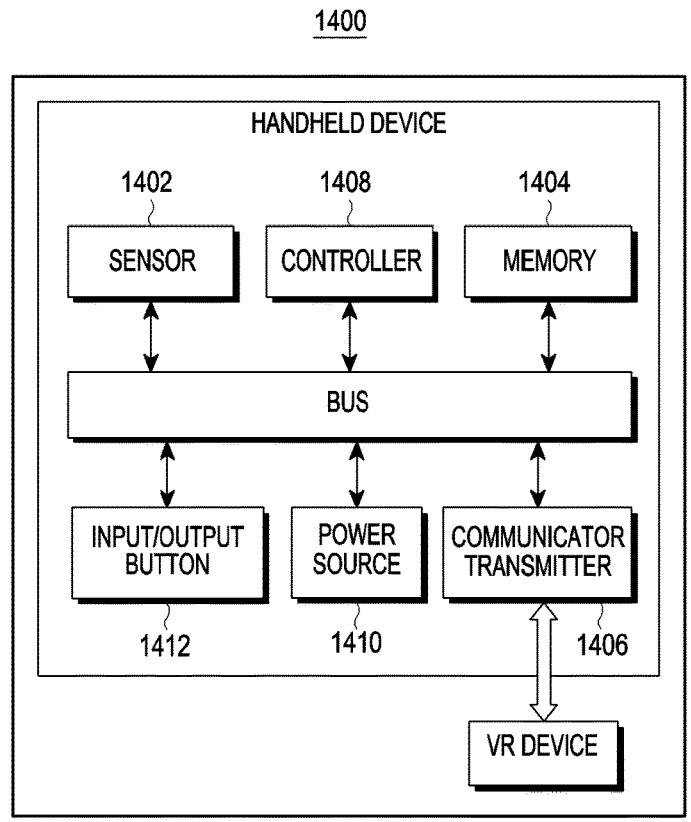
[Fig. 15]
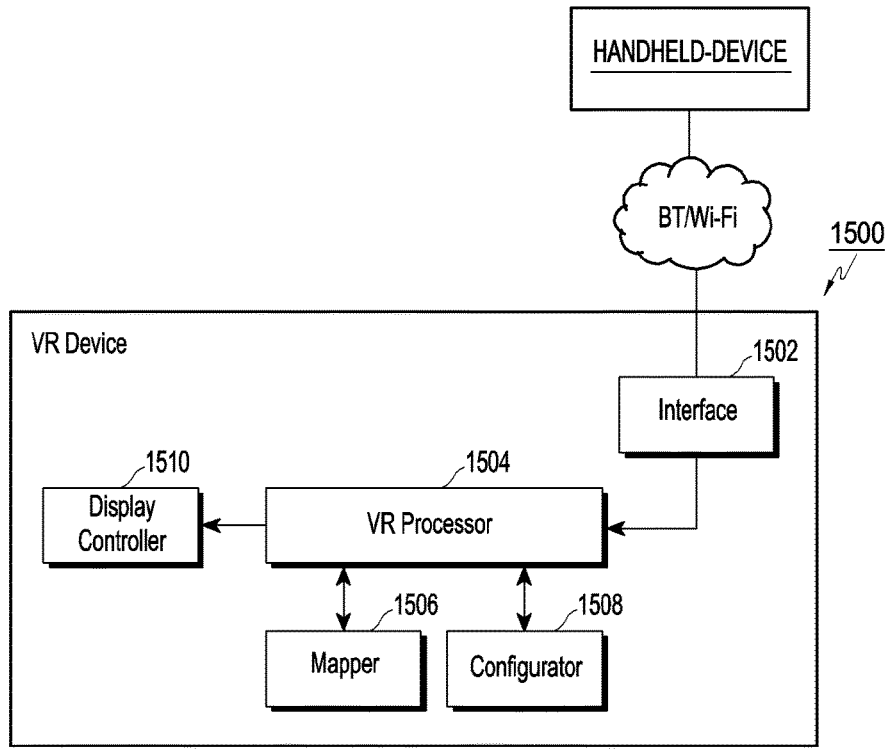

[Fig. 16]
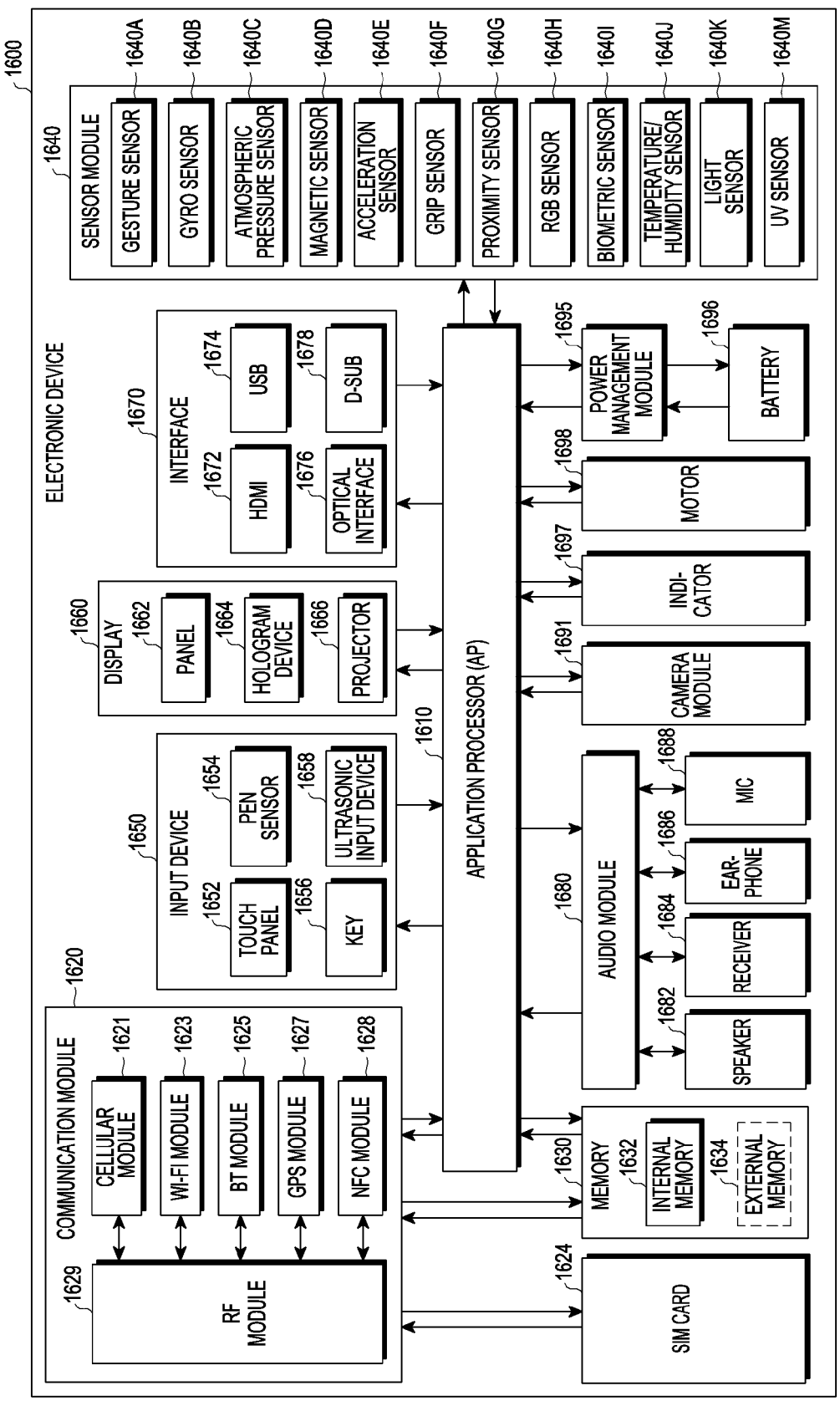

[Fig. 17]
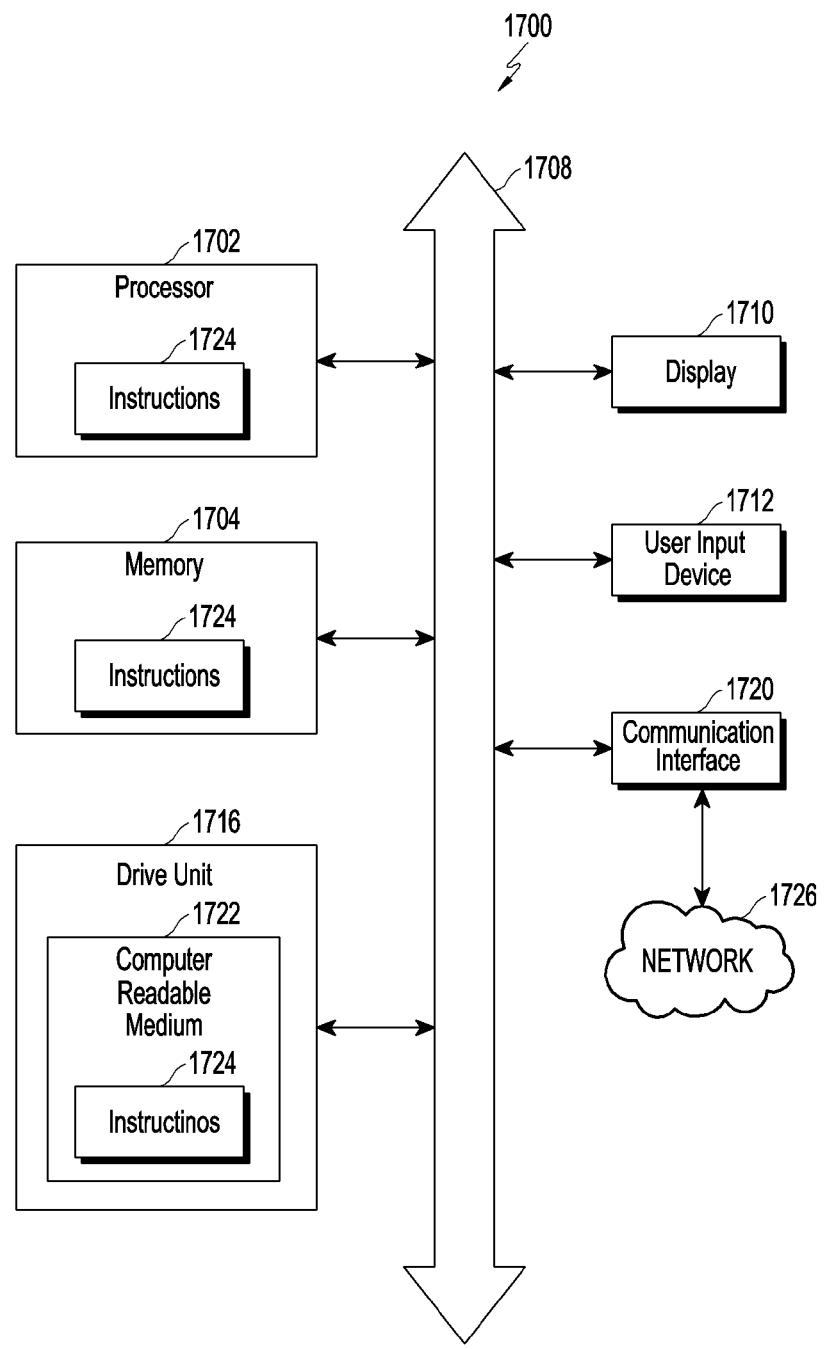

METHOD AND APPARATUS TO NAVIGATE A VIRTUAL CONTENT DISPLAYED BY A VIRTUAL REALITY (VR) DEVICE

TECHNICAL FIELD

The disclosure relates to computing-devices and in particular relates to virtual reality (VR) rendering devices.

BACKGROUND ART

A common operation required while using a VR device is scene-navigation within a virtual world or environment as rendered by the VR device. Navigation literally denotes moving from one view to another. In terms of VR, the navigation denotes displacement of the view of the virtual world with respect to a user as per his/her command. Alternately, navigation with respect to VR denotes moving from a current view of the virtual world to another view as per user's interest. Such navigation is required to view a currently rendered virtual world from different-directions/orientations as a part of traversal of the virtual world. In other example, the 'change-in-view' accomplished as a part of navigation also denotes a traversal from one virtual world to a different virtual world, wherein another world is also rendered by the same VR device and may be accordingly viewed from different directions.

An example of the navigation across the virtual world may be a participant user in a shooting game looking/seeing in all directions of the virtual world and trying different-viewing angles to locate the enemy. Yet another example of navigation in VR includes a user navigating a live/recorded 360° video content, sports, etc and changing view.

Currently available measures to render input commands for scene-navigation in the virtual world include user's head movement, when a user is connected to the virtual world using an head mounted device (HMD) as depicted in FIG. 1(a). Likewise, other examples include user's body-gestures or posture as sensed by sensors within the HMD and communicated to a processing-module thereof, drawing of finger-gesture over a touch pad linked to the VR device, remote-controller with touch pad as handheld-accessory, etc.

DISCLOSURE OF INVENTION

Technical Problem

In all the above methods, the user needs to continuously use his/her body parts (hands, fingers, and head, etc.) for scene-navigation in the virtual world. If such movements continue for a long time, it is probable to result in fatigue. For example, a continuous-movement of head using the HMD for scene navigation in the virtual world may result in neck strain as depicted in FIG. 1(b). Moreover, in case the user himself is permanently or temporarily disabled he may not be able to exhibit a substantial number of gestures as otherwise required by the VR device as the navigation-input. On a general note, the physically-challenged persons and/or senior-citizens always find it difficult to perform simple body-movements like rotating head/neck and/or twisting back for navigation, and accordingly largely remain incapable of navigating the virtual world.

Furthermore, even an otherwise normal human being is not able to exhibit certain degree(s) of motion with ease for navigating the virtual world. For example, as shown with respect to the example depicted in FIG. 1(c) and FIG. 1(d), if the user wants to navigate to his/her backside, then it's not physically possible to move his head backwards and execute rotary movements by 180° (either sideways or vertically). To put it differently, the user is constrained by natural head movements that are permissible sideways or vertically only in a hemisphere lying in front of human-body. Accordingly to compensate such movement limitations, the user has to twist his back or rotate completely to navigate in his/her backside view.

Another example of physically traumatizing navigation-based gesture in the virtual world includes usage of track-pad while lifting the hand. Likewise, there have been often incidents wherein the users glued to the virtual world through the HMD tend to self-inflict injuries while navigating, upon getting collided with obstacles of the real-world during the execution of gestures.

Largely, the conventional mechanisms for accomplishing the navigation in the virtual world end up requiring the user to exhibit movements using a combination of head and other movable body-parts (neck, hands, back, legs etc), in order to achieve all types of navigation. Accordingly, said mechanisms for navigation also remain difficult to learn and are accordingly less 'intuitive' in nature for a human being.

Likewise, the conventional holographic-devices rendering the holographic content also remain plagued by aforesaid drawbacks, in respect of navigation of the rendered holographic content.

Accordingly, there lies a need to minimize the extent and type of physical-movements exercisable by a human-being during the course of navigating the virtual world or any other type of 3D content such as holographic-content, and still achieve all the standardized types of navigation.

There lies yet another need to develop navigation-mechanisms that are easy to operate and learn, and are accordingly more 'intuitive' in nature.

Solution to Problem

This disclosure is provided to introduce a selection of concepts in a simplified format that are further described in the detailed description of the invention. This disclosure is not intended to identify key or essential inventive concepts of the invention, nor is it intended for determining the scope of the invention.

In an embodiment, a method by a first device is provided. The method comprises displaying a first view of virtual content on the first device, establishing connection between the first device and a second device, receiving movement data of the second device through the established connection, obtaining at least one of direction information and rotation information based on the received movement data, and changing the first view to a second view corresponding to the obtained at least one of the direction information and the rotation information in the virtual content.

In other embodiment, a first device is provided. The first device comprises a display configured to display a first view of virtual content on the first device, a transceiver configured to establish connection between the first device and a second device, and receive movement data of the second device through the established connection, and at least one processor configured to obtain at least one of direction information and rotation information based on the received movement data, and change the first view to a second view corresponding to the obtained at least one of the direction information and the rotation information in the virtual content.

In another embodiment, a method to navigate a virtual content displayed by a virtual reality (VR) device is provided. The method comprises establishing connection between the virtual-reality device and a handheld-device. Thereafter, a handheld-device movement data is received, wherein the movement data comprises at least one of direction-parameters and rotation-parameters at the virtual reality device. The movement data corresponding to the movement of handheld device is mapped to a current-view of the virtual content displayed on the virtual reality device. Based on the handheld device movement data, navigation is executed from the current view of the virtual content displayed on the virtual reality device.

In another embodiment, the VR device for displaying a virtual content is provided. The VR device comprises an interface for establishing connection with a communication module of a handheld device. A receiver receives a handheld device movement data comprising at least one of direction-parameters and rotation-parameters from the handheld device. A mapper maps the handheld device movement data corresponding to the handheld device to a current view of displayed virtual content. A processing module facilitates navigation from the current-view of the virtual content based on the handheld-device movement data.

In another embodiment, a method to navigate a holographical content displayed by a holographic device is provided. The method comprises establishing connection between the holographic device and a handheld-device. Thereafter, a handheld-device movement data is received, wherein the movement data comprises at least one of direction-parameters and rotation-parameters at the holographic device. The handheld device movement data corresponding to the handheld device is mapped to a current-view of the content displayed by the holographic device. Based on the handheld device movement data, navigation is executed from the current view of the holographic content.

In another embodiment, a holographic device for displaying holographic content is provided. The holographic device comprises an interface for establishing connection with a communication module of a handheld device. A receiver receives a handheld device movement data comprising at least one of direction-parameters and rotation-parameters from the handheld device. A mapper maps the handheld device movement data corresponding to the handheld device to a current view of a displayed holographic-content. A holographic content processing module facilitates navigation from the current-view of the holographic-content based on the handheld-device movement data.

The disclosure addresses all such problems related to navigation in Virtual World and other type of 3D content (e.g. a holographic-content). Accordingly, the proposed invention at least enables a user at providing input for the navigation by rotating the handheld device in particular direction with minimal user movement, minimal user attention and very limited real world space near user. Thus, the user is able to traverse the Virtual World or any other 3D content for a longer duration, without being plagued by physical exertion.

Moreover, the physical movements (e.g. in-place rotation) exhibited by the user during the course of navigation are confined within a small-real world space, thereby highly minimizing probability of collision with real-world obstacles. Furthermore, user executed physical movements actually tend to substantially correlate with the type of navigation action as executed, thereby lending the mechanism an "intuitive" aspect.

To further clarify advantages and features of the disclosure, a more particular description of the invention will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings.

BRIEF DESCRIPTION OF DRAWINGS

These and other features, aspects, and advantages of the disclosure will become better understood when the following detailed description is read with reference to the accompanying drawings in which like characters represent like parts throughout the drawings, wherein:

FIG. 1 illustrates a conventional VR device, and adverse-effects and restricted movements associated with the usage thereof;

FIG. 2 illustrates a method to navigate virtual content displayed by a virtual reality (VR) device in accordance with an embodiment of the disclosure;

FIG. 3 illustrates a detailed internal construction of a system in accordance with an embodiment of the disclosure;

FIG. 4 illustrates a method to navigate holographic-content displayed by a holographic-device in accordance with another embodiment of the disclosure.

FIG. 5 illustrates a detailed internal construction of a holographic device interacting with the handheld device in accordance with an embodiment of the disclosure.

FIG. 6 illustrates an exemplary control-flow diagram depicting a process in accordance with an embodiment of the disclosure.

FIG. 7 illustrates exemplary types of rotations as otherwise executed by the handheld device or the stylus in accordance with an embodiment of the disclosure.

FIG. 8 illustrates different types of rotation imparted to the handheld device in accordance with an embodiment of the disclosure.

FIG. 9 illustrates an overhead view of a user wearing the VR device and operating the stylus in accordance with an embodiment of the disclosure.

FIG. 10 illustrates yet another exemplary representation of virtual world as rendered by the VR device in accordance with an embodiment of the disclosure.

FIG. 11 illustrates yet another exemplary implementation, at least in terms of city-surveillance enabled through traffic-condition monitoring in accordance with an embodiment of the disclosure.

FIG. 12 illustrates yet another exemplary implementation in accordance with an embodiment of the disclosure.

FIG. 13 illustrates yet another exemplary implementation in accordance with an embodiment of the disclosure.

FIG. 14 illustrates architecture of the handheld device in accordance with an embodiment of the disclosure.

FIG. 15 illustrates architecture of the VR device in accordance with an embodiment of the disclosure.

FIG. 16 illustrates another architecture of the VR device or the holographic device in accordance with an embodiment of the disclosure.

FIG. 17 illustrates a computing-device based implementation in accordance with an embodiment of the disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

MODE FOR THE INVENTION

It should be understood at the outset that although illustrative implementations of the embodiments of the disclosure are illustrated below, the disclosure may be implemented using any number of techniques, whether currently known or in existence. The disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Embodiments of the disclosure will be described below in detail with reference to the accompanying drawings.

FIG. 2 illustrates a method 200 to navigate virtual content displayed by a virtual reality (VR) device. The method 200 comprises establishing (step 202) connection between the VR device and a handheld device; wherein the handheld device is at least one of a stylus, an electronic pen, and a controller.

A handheld device movement data is sensed (step 203) by one or more sensors present within the handheld device, as and when the handheld-device undergoes movement. The sensors comprise one or more of an accelerometer, a motion-sensor, gyroscope, gravity, rotation sensor and magnetometer. Such sensed data is captured (step 203) or identified as one or more degrees of freedom out of six degrees of freedom, wherein each of said degree of freedom denotes data pertaining to one or more motion-type defined by: surge, sway, heave, roll, pitch and yaw. In an example, the handheld device movement-data refers to one or more of rotation along an axis (e.g. x, y, z) of a coordinate-system, rotation within at-least one plane (e.g. xz, yz, xy) of a coordinate-system, rotation defined in a three-dimensional space (e.g. rotation along axis that extends in all x, y, z directions of a coordinate system). Further, the handheld device movement data includes motion along an axis (e.g. x, y, z) of a coordinate-system, motion within at least one plane (e.g. xz, yz, xy) of a coordinate-system, and motion exhibited in a three-dimensional space (e.g. motion along axis that is defined by x, y and z coordinates of a coordinate system). While a nature of rotation (e.g. clockwise or anti-clockwise) defines rotation parameters of the handheld device movement data, direction parameters of handheld device movement data may be associated with the 'motion' (e.g. linear motion) as exhibited in the cardinal directions (e.g. north, south, east, west), relative directions (left, right, forward, backwards, up, and down) or a combination thereof.

The handheld device movement-data undergoes processing either within the handheld-device and is thereafter communicated/transmitted to the VR device as a part of the step 203. In the alternative, the movement data is transmitted in an unprocessed state to the VR device through the step 203 and thereafter processed by the VR-device upon receipt as a part of following step 204.

As may be understood, the handheld device movement data comprising at least one of direction-parameters and rotation-parameters is received (step 204) at the VR device and undergoes processing, in case of non-performance of processing during the step 203. Thereafter, such handheld device movement data corresponding to the handheld device is mapped (step 206) to a current view of the virtual content displayed on the VR device. The virtual-content comprises a 360° video, 3D content, and panoramic content or any other possible form or variant of three-dimensional content. The mapping comprises scaling the direction and rotation parameters of the handheld device movement data by a pre-defined ratio, the scaling corresponding to up-scaling or downscaling.

Thereafter, a trigger is generated to cause navigation from the current view as a visually-perceptible motion based on the scaled parameters. Such visually-perceptible motion pertaining to the navigation may be a change in the display from the current-view in a relative-direction defined by either of leftwards, rightwards, upwards, or downwards of the current-view. In other example, the change in the display from the current view may occur in a direction which is a combination of the relative-directions with respect to the current view. Likewise, such change in the display may also occur through rotation, i.e. rotation leading to a shift from the current display to another display.

Based on the generated trigger, navigation (step 208) is accomplished from the current view of the virtual content as displayed on the virtual reality device.

In an implementation, prior to such navigation and as a part of the step 204, the handheld-device movement data may be filtered to prevent non-desired navigation. For example, such unwanted handheld device movement data relates to at least an unintended movement of the handheld device. Likewise, the desired handheld device movement data includes abrupt movement of the handheld device exceeding a first threshold value, and a gradual movement of the handheld device exceeding a second threshold value. In other words, impermissible and permissible data may be defined based on the one or more pre-configured threshold values.

Further, as the handheld device movement data is received at the virtual reality device as a data-stream, the current view of the virtual content at the VR device is continuously updated based on detecting updates within the received movement data. For example, upon detecting the handheld device movement data as being greater than a threshold value, an action resulting in continuous-update of the current-view of the virtual-content may be performed. Such update of the current view or shift from the current view takes place as a part of navigation. However, in case of no variation in the handheld device movement data, the current display remains unchanged.

FIG. 3 illustrates a detailed internal construction of a system in accordance with the embodiment of the disclosure. The system is constituted by a VR device 300 and a handheld device 302. The VR device 300 includes an interface 308 that performs the step 202 for establishing a data-communication channel with the handheld device 302. The handheld-device 302 may itself be an assembly of sensors 304 that senses movements underwent by the handheld device 302, and a transmitter 306 for transmitting data (captured from the sensors) through the communication channel established with the VR device 300. The handheld device 302 accordingly performs the step 203.

Further, the VR device 300 includes a receiver 310 that performs the step 204 based on data communicated from the handheld device 302, a mapper 312 that performs the step 206 and a processor 314 that performs the step 208. Likewise, there may be manager(s) 316 within the VR device 300 that are configured to execute one or more ancillary functions based on the operational-interconnection among the components 308 till 314. In an example, the manager(s) 316 may include an analyzer for detecting whether the handheld device movement data as received through the receiver 310 is greater than a threshold value and thereafter triggering the processor 314 for resulting in a continuous-update of the current view of the virtual content as displayed on the VR device 300. Other examples of manager(s) may include standard essential components such as power-manager, audio-module etc. Further, the manager(s) 316 may also include components for executing 'optional' or non-essential functions based on the operational-interconnection among the components 308 till 314. In an example, the manager(s) 316 may include a filter as an optional module to filter out unintended handheld-device movement data, e.g. movement due to inadvertent shaking of hands.

FIG. 4 illustrates a method 400 to navigate holographic-content displayed by a holographic-device, such that the steps 402, 403, 404, 406 and 408 correspond to the steps 202, 203, 204, 206 and 208, respectively. However, the virtual content as otherwise depicted in FIG. 2 may be understood as holographic-content. As may be understood, the virtual world rendered by the VR device allows the user to be virtually present within the virtual world through rendering the user's location or point of view as a part of the virtual world. However, the holographic content is rendered or displayed by the holographic device as a projection in free space. Accordingly, the rendering of holographic content renders the user a view of the holographic content as if the holographic content is located a distance apart, unlike the rendering of the virtual world.

Further, the handheld device movement data comprising direction and/or rotation parameters when considered in respect of the holography refers to a rotational-motion data corresponding to a rotational motion as well as a non-rotary motion exhibited by the handheld device. While the rotational parameters correspond to the rotational motion, the directional parameters correspond to the non-rotary motion (e.g. a linear motion) as imparted to the handheld device. Such correspondence between rotation and direction parameters on one hand and rotary/non-rotary motion on other hand is analogous to the description of step 203 in FIG. 2. The rotational-motion or non-rotary motion is sensed by at least one sensor within the handheld-device. Such rotational-motion as underwent by the handheld device may be along an axis of a coordinate-system, within at least one plane of a coordinate system, or defined in a three-dimensional space. In case of sensing of non-rotary motion, the non-rotary motion is converted into an equivalent rotary motion as a part of generation of handheld device movement data.

FIG. 5 illustrates a detailed internal construction of a holographic device 500 interacting with the handheld device 302 in accordance with the embodiment of the disclosure. The holographic device 500 or the holographic device 500 includes an interface 502 that performs the step 402 for establishing a data communication channel with the handheld device 302. The handheld device 302 in turn performs the step 403.

Further, the holographic device 500 comprises a receiver 504 that performs the step 404 based on data received from the handheld device 302, a mapper 508 that performs the step 406 and holographic content processor 506 that performs the step 408. Likewise, there are managers 510 within the holographic device 500 that are analogous to the manager(s) 316 for executing device-specific functions, standard essential functions (e.g. power management, audio output) and optional functions (e.g. filtering out of unintended movement data) based on data as has been generated owing to the operational interaction of the components 502 till 508. In an example, the managers 510 may include a rotary-motion computation module for executing a device-specific function of computing an equivalent rotational-motion data, in case a non-rotational motion is exhibited by the handheld device 302 as a part of generation of the handheld device movement data.

FIG. 6 represents an exemplary-control flow diagram depicting a process in accordance with an embodiment of the disclosure. A control flow illustrated in FIG. 6 may be associated with methods of FIG. 2 and FIG. 4. The control flow is to facilitate the user with convenient setup such that user can easily navigate in the virtual world. The handheld device accepts the inputs from the user by undergoing rotation in particular direction in the actual world. As the VR device shows a view of the virtual world, the user navigates from one scene to another with the help of rotation of the handheld device. The rotation of the handheld device in particular direction results in the equivalent movement of scene in the virtual world. As an example with respect to the control-flow of FIG. 6 the handheld device has been hereinafter exemplarily referred as a stylus.

At step 602, the control flow of FIG. 6 initiates based on a successful-pairing between the VR device and the stylus. Thereafter, a movement of the stylus is sensed by use of one or more of the sensors (a) gyroscope and (b) accelerometer within the stylus, so as to determine the rotation and change in the position as well as direction of stylus. As mentioned before, the stylus lies paired via Bluetooth or any other wireless medium with another device, i.e. a VR device. Generally, an angular motion of the stylus in three dimensional space can be determined with the help of gyroscope and speed of the stylus' linear motion may be determined in three dimensional space with the help of accelerometer. The step 602 corresponds to steps 202 and 402 as a part of connection-establishment and to the steps 203 and 403 as well to the extent of 'movement-sensing' within the stylus.

At step 604, the sensor-data as generated by the stylus in step 602 is processed for conversion into a movement-data as a part of 'capturing of sensor data'. A 'Sensor Data Manager', which may be a component/module of stylus, captures the rotation and movement of stylus in free space using above mentioned data generated by the sensors. Signal captured from the gyroscope enables the calculation of the angular-velocity of the rotation along the XYZ-axis, while signals from the accelerometer enable calculation of the change of velocity in the three-dimension space.

In an example, p radians/second: movement detected by the gyroscope along X axis q radians/second: movement detected by the gyroscope along Y axis r radians/second: movement detected by the gyroscope along Z axis a m.s$^{-2}$: acceleration detected by the accelerometer along X axis b m.s$^{-2}$: acceleration detected by the accelerometer along Y axis c m.s$^{-2}$: acceleration detected by the accelerometer along Z axis Let Mg is the movement detected by the gyroscope. Mathematically it can be represented as Math FIG. 1:

$$Mg = px + qy + rz \text{ rad/sec.} \quad \text{[Math.1]}$$

And its magnitude can be represented as Math FIG. 2:

$$|Mg| = \sqrt{p^2 + q^2 + r^2} \quad \text{[Math.2]}$$

Let Ma be the movement detected by the accelerometer. Mathematically it can be represented as Math FIG. 3:

$$Ma = ax + by + cz \text{ m·s}^{-2} \quad \text{[Math.3]}$$

And its magnitude can be represented as Math FIG. 4:

$$|Ma| = \sqrt{a^2 + b^2 + c^2} \quad \text{[Math.4]}$$

Accordingly, the operation of the sensor data manager within the stylus is triggered whenever there is any movement experienced by the stylus. The sensor data manager packetizes this generated movement data in a shared memory of stylus for allowing access to various applications within or outside the stylus. For applications residing outside the stylus, an in-built transmitter access data from memory and communicates the same to an external device, e.g. to a VR device.

The aforesaid illustration of step 604 illustrates processing of sensor data to generate movement data as a part of functionality of the stylus. In the alternative, the 'capturing of data' in step 604 does not include generation of movement data as illustrated above. On the contrary, it merely denotes an access of sensor data or unprocessed data (generated in step 602) by the in-built transmitter of the stylus for communication to the VR device. This may be attributed to absence of sensor data manager from the stylus and presence into the external device, e.g. within the VR device. In such scenario, the packetized data as stored within the memory of the stylus may be understood as 'mere' readings from sensors (gyroscope and accelerometer). Accordingly, generation of movement data based on processing of sensor-data takes place within the VR device.

The step 604 corresponds to the steps 203 and 403 to the extent of 'capturing' of handheld device movement data.

Step 606 denotes communication of data whether unprocessed (i.e. sensor data) or processed data (i.e. data generated by data sensor manager) from the stylus to the paired VR device. More specifically, the communication module within the stylus extracts the information (unprocessed or processed) from the shared memory of stylus. The data is communicated wirelessly through any known communication topology, such as a Bluetooth, IR, wireless network etc. This communication-link is activated during the pairing of the stylus with the VR device and deactivated when unpaired.

The step 606 corresponds to 'data-transmission' from the stylus as shown in the steps 203 and 403 of FIG. 2 and FIG. 4.

Step 608 denotes receipt of data by the VR device. The VR device has a component named "Interface", whose responsibility is to receive the data from the communicator of the stylus. This received data includes the information about the movement of the stylus. This received information is placed in shared memory of the VR device. The step 608 also corresponds to the steps 204 and 404 of FIG. 2 and FIG. 4.

Step 610 denotes testing whether the data as received and stored within the memory of the VR device is valid data. The validity of data may be checked based on comparison with respect to pre-configured threshold value(s) of gyroscope and accelerometer-data as set by the user (described in FIG. 15). Based on the set threshold value, a valid data is filtered out and unintended data is discarded. Such unintended data corresponds to noise or any unintended movement imparted to the stylus by shivering/shaking of hands.

The step 610 is executed right after step 608 in case the data as received by the VR device from the stylus during the step 608 is 'movement data' i.e. processed data and not merely 'sensor data'. However, in case the data is received from the stylus in step 608 is unprocessed (i.e. the 'capturing' in step 604 does not amount to data-generation), then the movement is calculated by the sensor data manager present in the VR device as a part of an optional step 609 and eventually, it is the processed data which gets stored within the shared memory of the VR device. Thereafter, the execution of step 610 takes place for testing the stored data. Accordingly, the step 609 also corresponds to generation of movement data as explained in step 604 and as referred in description of FIG. 2 and FIG. 4.

Further, while step 609 is optionally executed by the VR device depending on the input received from the stylus, the step 610 may also be optionally performed by the VR device irrespective of the input received from the stylus. In an example, the VR device may not execute step 610 and accordingly may not filter out unintended handheld device movement data (e.g. generated due to hand-shaking), and thereby appropriate entire handheld device movement data. Overall, both of the steps 609 and 610 may be optionally performed by the VR device.

At step 614, the hand held device movement data as calculated in preceding steps is classified into two categories based on comparison of magnitudes the movement data, i.e.

|Ma| and

|Mg| with corresponding pre-configured threshold value,

|Ta|
and
|Tg|
as set by the user as a part of configuration settings (elaborated later in FIG. 15)

In case the magnitudes
|Ma|
and
|Mg|
exceed
|Ta|
and
|Tg|,
respectively, then it will be considered as quick movement. Such quick movement results in a continuous 360-degree scrolling navigation along any direction in a 3 dimensional-space, and has been depicted via step 616. Else, the control passes to step 618. The step 616 corresponds to step 208 and 408 of FIG. 2 and FIG. 4, respectively.

At step 618, a one-to-one mapping is used to find the navigated position in the virtual world. Using a mapper, angles of the final position are computed in order to shift from the current view to another view.

More specifically, the mapper maps rotation of the stylus to VR scene navigation. 'One-To-One mapping' means that for each stylus rotation input in real world, there will be corresponding rotation of scene in the virtual world. Degree of rotation in virtual world depends on preconfigured ratio "n" value, which is also set as a part of configuration settings while setting up
|Ta|
and
|Tg|,
as later illustrated with respect to FIG. 15.

Based on the stylus rotation information read by this module, new VR navigation coordinates are calculated. This new coordinate (position) is used for the navigation in the virtual world. The direction and speed of stylus governs the navigation in the virtual world, i.e. the faster rotation of stylus will result in faster navigation in virtual world and vice versa.

Suppose X, Y and Z-axis are the real world axis along which the stylus can be rotated and X', Y' and Z'-axis are the respective virtual world axis such that X' is mapped to X, Y' is mapped to Y and Z' is mapped to Z axis respectively.

Now let's assume that with respect to the current view in the virtual world, the corresponding angles are
$\alpha°, \beta°, \theta°$
with respect to X', Y' and Z' axis respectively. Also assume that the sampling rate of data captured at the stylus is 1 second. Now, if the gyroscope data is p, q and radians/second, then the corresponding movement captured with respect to the gyroscope is represented as: Mg=px+qy+rz, wherein 'p', 'q' and 'r' are radians/second.

Accordingly, the final angles (
$\alpha'°, \beta'°, \theta'°$
) are calculated as Math FIG. 5:

$$\alpha'=\alpha+(p*180/\pi)$$

$$\beta'=\beta+(q*180/\pi)$$

$$\theta'=\theta+(r*180/\pi) \quad [Math.5]$$

where $\pi$ (pi)=22/7

Now, the application uses
$\alpha'°, \beta'°, \theta'°$
to navigate from the current view to a next view in the virtual world. The present step 618 corresponds to step 206 and 406 of FIG. 2 and FIG. 4, respectively.

At step 620, the navigation is executed to the next view based on the computed angles in step 618. The navigation is executed as a visual perceptible effect to a user, such that the user by virtue of his/her vision is imparted a feeling as if the user has moved into a direction corresponding to any one or combination of the relative directions (left, right, up, down) with respect to the current view and thereby reached the next view. In other scenario, the user may also feel as if he/she has undergone rotation in free space in order to reach the next view from current view.

As may be understood, the fact that the visual perceptible motion is linear or rotary depends as to how best the next view may be achieved from the current view. For example, in case the next view is also located in front of the user, i.e. the user merely requires a slight turn of head to reach the next view while wearing a conventional VR device, then the visual perceptible motion is linear or translation in nature. In other scenarios, wherein the user requires a substantial turn of neck to reach the next view through the conventional VR device, then the visual perceptible motion as associated with the navigation is also rotary in nature.

Each of the steps 616 and 620 represent the steps 208 and 408 of FIG. 2 and FIG. 4.

FIG. 7 illustrates exemplary types of rotations as otherwise executed by the handheld device or the stylus. More specifically, FIG. 7(a) illustrates rotary movements of the stylus along y-axis, FIG. 7(b) illustrates rotary movements of the stylus along z-axis, and FIG. 7(c) illustrates rotary movements of the stylus along x-axis. Yet, such illustrated rotation are merely exemplary in nature and the disclosure may be understood to cover other types of rotation such as along any axis defined in xy, yz or zx plane or in free space defined by x, y, z coordinates. Further, FIGS. 7(d) and 7(e) illustrate another exemplary rotation of the stylus about its own axis in opposite directions.

FIG. 8 illustrates different types of rotation imparted to the handheld device in accordance with an embodiment of the disclosure. More specifically, FIG. 8 depicts an illustration, wherein different types of rotation may be imparted to the handheld device, hereinafter referred to as the stylus with respect to FIG. 8 till FIG. 13, for navigation in different directions within the virtual world as rendered. In the example, the virtual world as rendered is Taj-Mahal in background, and a river is in foreground. More specifically, the virtual world as created depicts Taj-Mahal as being located far away from the user, while a river and living beings traversing the river appear to be located just in front of the user. Accordingly, while the Taj Mahal in the virtual world appears smaller in size owing to being a distant object, the river and the traversing living beings however appear larger in size for being closer to the user in the virtual world.

As represented in the FIG. 8, a virtual tour is initiated by pairing the VR device with the handheld stylus. Initially, the viewer or user is holding the stylus such that the tip of stylus is pointing away from his body. The alignment of stylus in real world and VR scene in the virtual world is shown in FIG. 8(a). After pairing of stylus with VR device, the user is able to see the first scene 802 in the VR display. The current position of stylus is considered as the initial position of the stylus and this alignment of stylus is mapped to present scene 802 in the VR device i.e. the initial-view as illustrated in FIG. 8(a). As may be observed, FIG. 8a depicts "Taj Mahal" at the center of user's line of sight in virtual world as a part of current view.

FIG. 8(b) illustrates shifting to another view 804 in the virtual world, which depicts the sky and clouds above the Taj-Mahal. In other words, the view of FIG. 8(b) lies vertically above the view in FIG. 8(a). For such purposes, the stylus positioned in FIG. 8(a) is rotated 'anti-clockwise' along the 'x-axis' which results in up navigation of VR view by certain degrees. Thereafter, the user returns to the position illustrated in FIG. 8(a) from FIG. 8(b) by rotating the stylus clockwise along the x-axis, thereby leading to restoration of the position as illustrated in FIG. 8(a).

FIG. 8(c) illustrates shifting to another view 806 in the virtual world, wherein the view of FIG. 8(c) lies inclined rightwards of the representation in FIG. 8(a). In order to reach such another view 806, the user rotates the stylus clockwise along y-axis and then clockwise along x-axis. As a result of this stylus movement, the VR scene is navigated to another monument on the right of Taj Mahal. For sake of brevity, FIG. 8(c) illustrates only the clockwise rotation of stylus about y axis.

FIG. 8(d) illustrates shifting to another view 808 from FIG. 8(c), wherein the view in FIG. 8(d) lies vertically downwards. Accordingly, to reach FIG. 8(d) from FIG. 8(c), the user rotates the stylus (from the position exhibited with respect to FIG. 8(c) clockwise direction along the z-axis. With this rotation, the user can now see another VR view in which "a human being riding the camel in water" is depicted.

Overall, with respect to an initial position of the stylus and a default view as illustrated in FIG. 8(a), each of the views from FIG. 8(b) to FIG. 8(c) is achieved upon rotation of the stylus, say by a certain angle, along either of x, y, or z axis. Although not shown in figure, but in an example, a 180° rotation of stylus along "y-axis" at any moment allows a user to shift to another view in the virtual world which is presumed to be behind the user. Likewise, any rotation described along an axis in free space may also lead to a shift to different-view. For example, an axis in free space may be defined by a combination of x, y and z coordinates.

Further, the stylus movement may also be linear along any of the axis x, y or z or along any axis in the free-space. Such linear movements accordingly results in a linear shift from the current view of the virtual world as a part of navigation. For example, a linear pull of the stylus along the positive-direction of x-axis results in navigation in right-direction and so on. Likewise, a linear pull of the stylus along an axis in the free-space may lead to navigation defined by combination of relative directions, e.g. (upwards left).

FIG. 9 illustrates an overhead view of a user 902 wearing the VR device and operating the stylus in accordance with an embodiment of the disclosure. As may be seen in the FIG. 9, the user 902 wearing the VR device as the HMD merely rotates the stylus gripped within the hand while keeping his head stationary, thereby avoiding all the head/body-part movement related constraints. Yet, the navigation across the virtual world proceeds as a part of normal-course and is triggered by the magnitude and direction of the rotary movements as executed by the stylus, as has been illustrated with respect to FIG. 8.

FIG. 10 illustrates yet another exemplary representation of virtual world as rendered by the VR device in accordance with an embodiment of the disclosure. The virtual world is a virtual conference room, wherein the participant members work from different geographic locations. In a virtual conference room as illustrated in FIG. 10(a), the participating members see each other around a circular-table, wherein participants come face-to-face with respect to each other by rotating the stylus. A participant, "Ms. Lina" is on the extreme-left of the user 1002 going by the name "Mr. Lee". When Mr. Lee speaks to Ms. Lina, the conventional VR devices compel him to rotate his head and hold such position till the end of discussion. As may be understood, keeping head rotated for a long time may cause fatigue. At least through the combination of the stylus pen and the VR device, Mr. Lee is able to navigate his view towards Ms. Lina merely by rotating the stylus towards her, and accordingly attain the view as illustrated in FIG. 10(b).

Likewise, the virtual world as depicted in FIG. 10 may be assumed as a shooting game, wherein Mr Lee has to virtually shoot-dead one of the participating members or opponents to win the game. In the scenario, where an opponent might be positioned behind Mr. Lee, he has to turn back and shoot him in a normal course of action. At least through the present subject matter, instead of turning himself completely, Mr. Lee can just turn the stylus exemplarily by 180° (say about y-axis) to change the view (backside-front). Accordingly, the opponent now gets positioned in front of Mr. Lee.

Likewise, a person having problem in the spinal-cord and neck and yet aspiring to navigate across the virtual world suffers handicap in terms of physically turning sideways for navigation through conventional means. The stylus movement of the disclosure enables the user to navigate sideways without moving his back, at least by a mere rotation of the stylus in the desired direction in horizontal plane.

FIG. 11 illustrates yet another exemplary implementation, at least in terms of city-surveillance enabled through traffic-condition monitoring in accordance with an embodiment of the disclosure. In all major cities, increasing traffic demands continues monitoring of traffic at major junctions for effective traffic control and for security surveillance purpose. Such cities, with city surveillance systems, contain 360° cameras at critical traffic-junctions (e.g. traffic crossing) with monitoring system at city control room.

In normal-surveillance, a human-being 1102 acting as an inspector at a control room and wearing the VR device has to monitor traffic and suspicious activities at these critical junctions. In typical scenarios, when he suspects something or gets call from location, he needs to quickly move his attention from current monitoring road to an opposite road. At least through the disclosure, it's easier for the traffic inspector 1102 to navigate to the opposite road from the currently viewed road, through the rotation of the stylus with 180° accompanied with a quick acceleration.

FIG. 12 illustrates yet another exemplary implementation in accordance with an embodiment of the disclosure, wherein a current rendered view of the virtual world is changed from one orientation to another through the stylus rotation, thereby leading to a change in the navigation track. For example, as illustrated in FIG. 12(a), a default view of the virtual world is depicted, wherein a horizontal navigation track is apparent. On the other hand, FIG. 12(b) illustrates a vertical navigation track for traversing the virtual world. To switch between FIGS. 12 (a) and 12(b), the stylus may be imparted rotation along its 'own' axis, irrespective of the orientation of the stylus in free-space. For example, an anticlockwise rotation results in switch from FIGS. 12(a) to 12(b), and a clockwise rotation results in vice-versa.

FIG. 13 illustrates yet another implementation in accordance with an embodiment of the disclosure, wherein a holographic device displaying holographic content through projections is under consideration.

In the example, the holographic content as projected is a human skeleton 1302. As per conventional holographic devices, to analyze different part of human skeleton, the user has to revolve around the skeleton that may cause fatigue. However, the disclosure enables a view of the human skeleton 1302 through the virtual world, which can be easily navigated using the stylus. While FIG. 13(a) depicts a default view of the holographic content 1302 with respect to a random-initial position of the stylus position, the stylus is thereafter progressively given rotation about y axis in order to rotate the holographic view of the skeleton. Accordingly, a pre-determined angular rotation about y-axis progressively results in different views of the skeleton 1302 as depicted in FIG. 13(b) to FIG. 13(d). Likewise, the stylus may also be rotated along x or z-axis or any other axis in free-space (e.g. an axis defined by combination of x, y and z coordinates) to change the orientation of the projected holographic content.

Further, instead of imparting rotation to the stylus for rotating the skeleton 1302 about the y-axis, the user may also instead linearly push or pull the stylus along the x or z axis or any other axis in free space. Such linear motion as imparted to the stylus, along the x or z axis or any other axis in free space, gets converted into a corresponding rotary motion about y axis, wherein such conversion is executed by the sensor data manager that may be present either within the stylus or form a part of the VR device. Such conversion corresponds to function of a rotary-motion computation module as illustrated in FIG. 5 with respect to the holographic device.

FIG. 14 illustrates architecture 1400 of the handheld device 302 in accordance with an embodiment of the disclosure. In an example, the handheld device 302 may be exemplarily hereinafter referred as 'stylus'.

As illustrated in the FIG. 14, a sensor(s) 1402 sense the movements using one or more constituent sensors, for example a gyro-sensor, an accelerometer, a gravity-sensor, a rotation-sensor, a magnetometer and execute the step 602 of FIG. 6. In case, the sensor data manager (as discussed in FIG. 6) forms a part of the stylus e.g. as a processor (not shown in FIG. 14), then the sensor data or data-readings from the sensors is processed within the device itself as a part of processing-action, thereby corresponding to the step 604. A memory 1404 is used to save data (whether mere sensor readings or processed data) so that it may be shared among modules and devices. Further, the data as generated is shared with other (paired) device (i.e. a VR device) using the communicator 1406 for further processing, thereby corresponding to the function as depicted in step 606. A controller 1408 (e.g. a microcontroller or at least one processor) controls data flow across all the components within the stylus, while a power source 1410 (e.g. an in-built battery) renders necessary-power for the operation.

Further, an input-device/button module 1412 is provided to control an existing button on the stylus. The button 1412 may be used for switching between an 'Object Interaction Mode' and 'Virtual world Navigation Mode'. Accordingly, the existing functions of the stylus as a 'selector for a touch-sensitive surface' may be preserved, while appropriating the stylus as a 'navigation-device' in accordance with the present subject matter.

As a part of its operation during the "Object Interaction Mode", the stylus could be used with tablet-computers. When the stylus is paired with a tablet that also contains these sensors, it is possible for the tablet to know the orientation of the stylus relative to itself. The tip of the stylus works with a capacitive touch screen and has a force sensing resistor, so the tablet knows how hard the stylus is being pressed against the screen. Since the tablet knows the orientation of the stylus relative to itself, the stylus interacts with map software to tilt, rotate, and pan a map. For example, the stylus could stay normal to the map whenever it is touching the screen, if the stylus is tilted relative to the screen, the map would tilt with it. The stylus could also interact with dials or joysticks on the screen when it is placed on top of them and rotated or tilted.

The stylus would have a force-sensing resistor in the tip to allow the tablet to know how hard the stylus is being pressed against the screen. This would allow an artist to use the stylus to shade an image in a similar way to using a pencil; the harder the stylus is pressed, the darker the color would be. The force sensor also makes the experience of writing on the screen more like writing on a piece of paper with a pen or pencil. In another exemplary application, the stylus may also be used with 3D-design software.

FIG. 15 illustrates architecture 1500 of the VR device 300 in accordance with an embodiment of the disclosure.

The VR device includes an interface 1502, whose responsibility is to receive the data from the communicator 1406 of the handheld device thereby executing the step 608. The handheld device has been hereinafter exemplarily referred as the stylus. The received data contains the information about the movement of the stylus. This received information is placed in a shared memory of the VR device from where other components or modules can access it for further processing.

A VR processor 1504 accesses the stylus movement data from the shared memory. In case the data as received from the stylus are merely sensor readings (i.e. unprocessed data), then the data is initially processed to compute stylus movement data in accordance with the optional step 609 and stored in the shared memory for further processing.

Thereafter, the VR processor 1504 or at least one processor 1504 appropriates the received or computed stylus movement data from the shared memory (whichever may be the case) and along with a mapper 1506 computes the next position of scene of interest in accordance with the steps 610, 614, 616, 618 and 620. While the processor 1504 executes the steps 609, 610, and 614, it triggers the mapper 1506 to execute the steps 618 and 620, in case the result of step 614 is 'No'. In case the result of step 614 is 'yes', the processor 1504 executes the step 616.

As may be understood, the execution of the steps 610 and 614 by the processor 1504 requires comparison with pre-defined threshold values. The pre-defined value may be computed through a configurator 1508 as a part of configuration of the settings of the VR device. More specifically, the configurator 1508 is used to set the threshold values for stylus movement or any other related configuration data in order to render the overall environment as friendlier and easy to use. After pairing the stylus with VR device, the user can configure the set-up to set threshold values for the user movement.

Stylus movement which is greater than the configured threshold value (quick movement) will result in continuous scene navigation (i.e. step 616) instead of one-to-one mapping as executed through steps 618 and 620. For example, if the user wants continuous left to right rotation in the virtual world then he/she can register the "quick right rotation" as threshold movement. Later, during virtual world navigation, this predefined quick movement is used to get the continuous rotation or navigation.

Below are the details of configurable data as configured by the user through the configurator 1508:

a. Tg: Magnitude of the threshold value of stylus movement captured by the gyroscope. Suppose the gyroscope data for threshold setting along the XYZ-axis is P, Q, R. Then threshold gyroscope reading can be represented as Math FIG. 6:

$$Tg = Px + Qy + Rz \quad \text{[Math.6]}$$

And, magnitude of the gyroscope reading can be defined as Math FIG. 7:

$$|Tg| = \sqrt{P^2 + Q^2 + R^2} \quad \text{[Math.7]}$$

b. Ta: Magnitude of the threshold value of stylus movement captured by the accelerometer. Similarly, if accelerometer data for threshold setting along the X, Y and Z-axis is A, B and C. Then threshold accelerometer reading can be represented as Math FIG. 8:

$$Ta = Ax + By + Cz. \quad \text{[Math.8]}$$

And, magnitude of the gyroscope reading can be defined as Math FIG. 9:

$$|Ta| = \sqrt{A^2 + B^2 + C^2} \quad \text{[Math.9]}$$

Also, to set the navigation speed undertaken as part of one-to-one mapping (i.e. as a part of steps 618 and 620), the user can configure the ratio of degree of rotation of the stylus to the virtual world. Default value of this ratio is 1:1. For example, if this ratio is set to 2:1, then 180° rotation of the stylus will result in 90° rotation in virtual world.

Accordingly, another type of configurable data is represented as follows:

'η'
:Ratio(proportion) in which VR navigation to be done w.r.t the movement of stylus.

$$\eta = \frac{\text{Degree of rotation of stylus}}{\text{Degree of rotation of scene in } VR \text{ world}} \quad \text{[Math. 10]}$$

Suppose X, Y and Z-axis are the real world axis along which stylus can be rotated and X', Y' and Z'-axis are the respective Virtual world axis such that X' is mapped to X, Y' is mapped to Y and Z' is mapped to Z axis respectively. Below table shows the example of rotation mapping of stylus pen and rotation of virtual world.

TABLE 1

| S. No | Configured Ratio "η" Stylus: VR/AR | Stylus Rotation | | | VR Rotation | | |
|---|---|---|---|---|---|---|---|
| | | X | Y | Z | X' | Y' | Z' |
| 1 | 1:1 | 20 | 10 | 10 | 20 | 10 | 10 |
| 2 | 1:2 | 10 | 20 | 30 | 20 | 40 | 60 |
| 3 | 2:1 | 20 | 40 | 10 | 10 | 20 | 5 |
| 4 | 2:1 | 0 | 60 | 0 | 0 | 30 | 0 |

As it may be clear from Table 1, the same depicts a "one-to-one" mapping of rotation of stylus and virtual world with different ratios as "η". Moreover, "upscaling" as referred in description of FIG. 2 takes place in case η>1, else "downscaling" takes place.

Finally, a display controller 1510 in operational interaction with the processor 1504 renders the display of virtual world, as well the visual perceptible motion that is imparted as a part of the navigation.

FIG. 16 illustrates another architecture of the VR device 300 or the holographic device 500 in accordance with various embodiments of the disclosure as a matter of elaborating constituent-electronics within the device. Accordingly, an electronic device 1600 as referred in present FIG. 16 may also be indicated as a VR device. The electronic device 1600 comprises may form, for example, the whole or part of the VR device or holographic device as shown in FIGS. 3, 5 and FIG. 15.

Referring to FIG. 16, the VR device 1600 may include at least one application processor (AP) 1610, a communication module 1620, a subscriber identification module (SIM) card 1624, a memory 1630, a sensor module 1640, an input unit 1650, a display 1660, an interface 1670, an audio module 1680, a camera module 1691, a power management module 1695, a battery 1696, an indicator 1697, and a motor 1698.

The at least one AP 1610 may be equivalent to the processing module 1504 as shown in FIG. 15. The at least one AP 1610 may drive an operating system or applications, control a plurality of hardware or software components connected thereto, and also perform processing and operation for various data including multimedia data. More specifically, the at least one AP 1610 executes the steps 609, 610, 614 as a part of generation/processing of handheld device movement data and filtering out unintentional handheld device movement data. In addition, the at least one AP 1610 may also denote a configuration module 1508 for configuring the threshold-value as depicted in FIG. 15. Further, the at least one AP 1610 may include a graphic processing unit (GPU) (not shown) for processing the multimedia-content for the rendering of the display.

The communication module 1620 may be the interface module 1502 as shown in FIG. 15. The communication module 1620 includes a communication processor (CP) and may perform a data communication with any other electronic device connected to the electronic device 1600 through the network. According to an embodiment, the communication module 1620 may include therein a cellular module 1621, a Wi-Fi module 1623, a BT module 1625, a GPS module 1627, an NFC module 1628, and a radio frequency (RF) module 1629. The communication-module 1620 executes the step 608 and accordingly receives the data (whether processed or un-processed) from the handheld device in a format compatible with one or more of aforesaid types of modules 1621, 1623, 1625, 1627, 1628 and 1629.

The cellular module 1621 may offer a voice call, a video call, a message service, an internet service, or the like through a communication network (e.g., LTE, LTE-A, CDMA, WCDMA, UMTS, WiBro, or GSM, etc.). Additionally, the cellular module 1621 may perform identification and authentication of the electronic device 1600 in the communication network, using the SIM card 1624. According to an embodiment, the cellular module 1621 may perform at least part of functions the at least one AP 1610 can provide. For example, instead of at least one AP 1610, the cellular module 1621 may perform at least part of a multimedia control function, e.g. steps 610 (i.e. filtering out of unintended handheld movement data) or facilitate setting-up of threshold value as a part of task executed by the configuration module 1508.

According to an embodiment, the cellular module 1621 may also include the communication processor (CP). Additionally, the cellular module 1621 may be formed, for example, of SoC. Although some elements such as the cellular module 1621 (e.g., the CP), the memory 1630, or the power management module 1695 are shown as separate elements being different from the at least one AP 1610 in FIG. 16, the at least one AP 1610 may be formed to have at least part (e.g., the cellular module 1621) of the above elements in an embodiment.

According to an embodiment, the at least one AP 1610 or the cellular module 1621 (e.g. the CP) may load commands or data, received from a non-volatile memory connected thereto or from at least one of the other elements, into a volatile memory to process them. More specifically, the at least one AP 1610 or the cellular module 1621 (e.g., the CP) may load handheld device movement data (processed or unprocessed) as received from the handheld device into a volatile memory for further action. Additionally, the at least one AP 1610 or the cellular module 1621 may store data, received from or created at one or more of the other elements, in the non-volatile memory. More specifically, the at least one AP 1610 or the cellular module 1621 may store the processed form of handheld device movement data in the non-volatile memory for further usage.

Each of the Wi-Fi module 1623, the BT module 1625, the GPS module 1627 and the NFC module 1628 may include a processor for processing data transmitted or received there through. Although FIG. 16 shows the cellular module 1621, the Wi-Fi module 1623, the BT module 1625, the GPS module 1627 and the NFC module 1628 as different blocks, at least part of them may be contained in a single integrated circuit (IC) chip or a single IC package in an embodiment. For example, at least part (e.g., the CP corresponding to the cellular module 1621 and a Wi-Fi processor corresponding to the Wi-Fi module 1623) of respective processors corresponding to the cellular module 1621, the Wi-Fi module 1623, the BT module 1625, the GPS module 1627 and the NFC module 1628 may be formed as a single SoC.

The RF module 1629 may transmit and receive data, e.g., RF signals or any other electric signals. Although not shown, the RF module 1629 may include a transceiver, a power amp module (PAM), a frequency filter, a low noise amplifier (LNA), or the like. Also, the RF module 1629 may include any component, e.g., a wire or a conductor, for transmission of electromagnetic waves in a free air space. Although FIG. 16 shows that the cellular module 1621, the Wi-Fi module 1623, the BT module 1625, the GPS module 1627 and the NFC module 1628 share the RF module 1629, at least one of them may perform transmission and reception of RF signals through a separate RF module in an embodiment.

The SIM card 1624 may be a specific card formed of SIM and may be inserted into a respective slot (not shown) formed at a certain place of the electronic device 1600. The SIM card 1624_N may contain therein an integrated circuit card identifier (ICCID) or an international mobile subscriber identity (IMSI).

The memory 1630 may include an internal memory 1632 and an external memory 1634. The internal memory 1632 may include, for example, at least one of a volatile memory (e.g., dynamic RAM (DRAM), static RAM (SRAM), synchronous DRAM (SDRAM), etc.) or a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the internal memory 1632 may have the form of a solid state drive (SSD). The external memory 1634 may include a flash drive, e.g., compact flash (CF), secure digital (SD), micro secure digital (micro-SD), mini secure digital (mini-SD), extreme digital (xD), memory stick, or the like. The external memory 1634 may be functionally connected to the device 1600 through various interfaces. According to an embodiment, the device 1600 may further include a storage device or medium such as a hard drive.

In an example, the memory 1630 may include programming modules such as a kernel, a middleware, an application programming interface (API), or an application. Each of the foregoing programming modules may include software, firmware, hardware, or a combination of at least two of software, firmware, and hardware.

The kernel may control or manage system resources (for example, the bus, the processor 1610, or the memory 1630) that are used in executing operations or functions implemented in other programming modules such as the middleware, the API, or the application. In addition, the kernel may provide an interface for allowing the middleware, the API, or the application to access and control or manage individual components of the device 1600.

The middleware may be a medium through which the kernel may communicate with the API or the application to transmit and receive data. In addition, the middleware may perform control operations (for example, scheduling or load balancing) in regard to work requests by one or more applications by, for example, assigning priorities for using system resources (the bus, the processor 1610, or the memory 1630 of the device 1600 to the one or more applications.

The API is an interface that may control functions that the application provides at the kernel or the middleware. For example, the API may include at least one interface or function (for example, a command) for file control, window control, video processing, or text control.

The sensor module 1640 may measure physical quantity or sense an operating status of the electronic device 1600, and then convert measured or sensed information into electric signals. The sensor module 1640 may include, for example, at least one of a gesture sensor 1640A, a gyro sensor 1640B, an atmospheric sensor 1640C, a magnetic sensor 1640D, an acceleration sensor 1640E, a grip sensor 1640F, a proximity sensor 1640G, a color sensor 1640H (e.g., RGB (red, green, blue) sensor), a biometric sensor 1640I, a temperature-humidity sensor 1640J, an illumination sensor 1640K, and a UV (ultraviolet) sensor 1640M. Additionally or alternatively, the sensor module 1640 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 1640 may include a control circuit for controlling one or more sensors equipped therein.

As may be understood, the sensor module 1640 is different from the sensors of the handheld device and accordingly operates independent of the sensor-operation in the handheld device. Accordingly, for the purposes of executing the steps 609, 610 and 614, the at least one AP 1610 only takes into consideration the sensor-input as received from the handheld device and ignores any input from the sensor module 1640.

The input unit 1650 may include a touch panel 1652, a digital pen sensor 1654, a key 1656, or an ultrasonic input unit 1658. The touch panel 1652 may recognize a touch input in a manner of capacitive type, resistive type, infrared type, or ultrasonic type. Also, the touch panel 1652 may further include a control circuit. In an embodiment including a capacitive type, a physical contact or proximity may be recognized. The touch panel 1652 may further include a tactile layer. In this example, the touch panel 1652 may offer a tactile feedback to a user.

The digital pen sensor 1654 corresponds to the handheld device operating in the 'object interaction mode' and may be formed in the same or similar manner as receiving a touch input or by using a separate recognition sheet. The key 1656 may include, for example, a physical button, an optical key, or a keypad. The ultrasonic input unit 1658 is a specific device capable of identifying data by sensing sound waves with a microphone 1688 in the device 1600 through an input tool that generates ultrasonic signals, thus allowing wireless recognition. According to an embodiment, the electronic device 1600 may receive a user input from any external device (e.g., a computer or a server) connected thereto through the communication module 1620.

The display 1660 (e.g., the display 1650) may include a panel 1662, a hologram 1664, or a projector 1666. The panel 1662 may be, for example, liquid crystal display (LCD), active matrix organic light emitting diode (AM-OLED), or the like. The panel 1662 may have a flexible, transparent or wearable form. The panel 1662 may be formed of a single module with the touch panel 1652. The hologram 1664 may show a stereoscopic image in the air using interference of light. The projector 1666 may project an image onto a screen, which may be located at the inside or outside of the device 1600. According to an embodiment, the display 1660 may further include a control circuit for controlling the panel 1662, the hologram 1664, and the projector 1666.

The display 1660 comprises the display-controller 1510 that operationally interacts with the at least one AP 1610 for rendering the display of virtual world, as well the visual perceptible motion. For such purposes, the at least one AP 1610 executes the steps 616, 618 and 620 in order to switch over to new display from an existing rendered display as and when necessary. More specifically, the at least one AP 1610 exhibits the functionality of the mapping module 1506 for triggering the display controller 1510, and thereby enables the display 1660 to render the appropriate display.

The interface 1670 may include, for example, a high-definition multimedia interface (HDMI) 1672, a universal serial bus (USB) 1674, an optical interface 1676, or a D-subminiature (D-sub) 1678. The interface 1670 may, for example, may constitute the sensor data interface (302, 502, 1502) as shown in FIGS. 3, 5 and 15. Additionally or alternatively, the interface 1670 may include, for example, a mobile high-definition link) interface, a secure digital (SD) card/multi-media card (MMC) interface, or an infrared data association (IrDA) interface.

The audio module 1680 may perform a conversion between sounds and electric signals. At least part of the audio module 1680 may be contained, for example, in the input/output interface of the VR device in FIGS. 3, 5 and 15. The audio module 1680 may process sound information inputted or outputted through a speaker 1682, a receiver 1684, an earphone 1686, or a microphone 1688.

The camera module 1691 is a device capable of obtaining still images and moving images. According to an embodiment, the camera module 1691 may include at least one image sensor (e.g., a front sensor or a rear sensor), a lens (not shown), an image signal processor (ISP)(not shown), or a flash (e.g., LED or xenon lamp, not shown).

The power management module 1695 may manage electric power of the device 1600. Although not shown, the power management module 1695 may include, for example, a power management integrated circuit (PMIC), a charger IC, or a battery or fuel gauge.

The PMIC may be formed, for example, of an IC chip or SoC. Charging may be performed in a wired or wireless manner. The charger IC may charge a battery 1696 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 1696 and a voltage, current or temperature in a charging process. The battery 1696 may store or create electric power therein and supply electric power to the electronic device 1600. The battery 1696 may be, for example, a rechargeable battery or a solar battery.

The indicator 1697 may show thereon a current status (e.g., a booting status, a message status, or a recharging status) of the device 1600 or of its part (e.g., the at least one AP 1610). The motor 1698 may convert an electric signal into a mechanical vibration. Although not shown, the device 1600 may include a specific processor (e.g., GPU) for supporting a mobile TV. This processor may process media data that comply with standards of digital multimedia broadcasting (DMB), digital video broadcasting (DVB), or media flow.

Each of the above-discussed elements of the VR device 1600 disclosed herein may be formed of one or more components, and its name may be varied according to the type of the electronic device. The VR device 1600 disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific integrated circuit (ASIC) chip, field-programmable gate arrays (FPGAs), and programmable-logic device, which have been known or are to be developed.

FIG. 17 illustrates a computing-device based implementation in accordance with an embodiment of the disclosure. FIG. 17 shows yet another typical hardware configuration of the system 300, 500, 1500, 1600 in the form of a computer system 1700. The computer system 1700 can include a set of instructions that can be executed to cause the computer system 1700 to perform any one or more of the methods disclosed. The computer system 1700 may operate as a standalone device or may be connected, e.g., using a network, to other computer systems or peripheral devices.

In a networked deployment, the computer system 1700 may operate in the capacity of a server or as a client user computer in a server-client user network environment, or as a peer computer system in a peer-to-peer (or distributed) network environment. The computer system 1700 can also be implemented as or incorporated across various devices, such as a VR device, personal computer (PC), a tablet PC, a personal digital assistant (PDA), a mobile device, a palmtop computer, a communications device, a web appliance, or any other machine capable of executing a set of instructions (sequential or otherwise) that specify actions to be taken by that machine. Further, while a single computer system 1700 is illustrated, the term "system" shall also be taken to include any collection of systems or sub-systems that individually or jointly execute a set, or multiple sets, of instructions to perform one or more computer functions.

The computer system 1700 may include a processor 1702 e.g., a central processing unit (CPU), a graphics processing unit (GPU), or both. The processor 1702 may be a component in a variety of systems. For example, the processor 1702 may be part of a standard personal computer or a workstation. The processor 1702 may be one or more general processors, digital signal processors, application specific integrated circuits, field programmable gate arrays, servers, networks, digital circuits, analog circuits, combinations thereof, or other now known or later developed devices for analysing and processing data The processor 1702 may implement a software program, such as code generated manually (i.e., programmed).

The computer system 1700 may include a memory 1704, such as a memory 1704 that can communicate via a bus 1708. The memory 1704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1704 includes a cache or random access memory for the processor 1702. In alternative examples, the memory 1704 is separate from the processor 1702, such as a cache memory of a processor, the system memory, or other memory. The memory 1704 may be an external storage device or database for storing data. The memory 1704 is operable to store instructions executable by the processor 1702. The functions, acts or tasks illustrated in the figures or described may be performed by the programmed processor 1702 executing the instructions stored in the memory 1704. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 1700 may or may not further include a display unit 1710, such as a liquid crystal display (LCD), an organic light emitting diode (OLED), a flat panel display, a solid state display, a cathode ray tube (CRT), a projector, or other now known or later developed display device for outputting determined information. The display 1710 may act as an interface for the user to see the functioning of the processor 1702, or specifically as an interface with the software stored in the memory 1704 or in the drive unit 1716.

Additionally, the computer system 1700 may include an input device 1712 configured to allow a user to interact with any of the components of system 1700. The computer system 1700 may also include a disk or optical drive unit 1716. The disk drive unit 1716 may include a computer-readable medium 1722 in which one or more sets of instructions 1724, e.g. software, can be embedded. Further, the instructions 1724 may embody one or more of the methods or logic as described. In a particular example, the instructions 1724 may reside completely, or at least partially, within the memory 1704 or within the processor 1702 during execution by the computer system 1700.

The disclosure contemplates a computer-readable medium that includes instructions 1724 or receives and executes instructions 1724 responsive to a propagated signal so that a device connected to a network 1726 can communicate voice, video, audio, images or any other data over the network 1726. Further, the instructions 1724 may be transmitted or received over the network 1726 via a communication port or interface 1720 or using a bus 1708. The communication port or interface 1720 may be a part of the processor 1702 or may be a separate component. The communication port 1720 may be created in software or may be a physical connection in hardware. The communication port 1720 may be configured to connect with a network 1726, external media, the display 1710, or any other components in system 1700, or combinations thereof. The connection with the network 1726 may be a physical connection, such as a wired Ethernet connection or may be established wirelessly as discussed later. Likewise, the additional connections with other components of the system 1700 may be physical connections or may be established wirelessly. The network 1726 may alternatively be directly connected to the bus 1708.

The network 1726 may include wired networks, wireless networks, Ethernet AVB networks, or combinations thereof. The wireless network may be a cellular telephone network, an 802.11, 802.16, 802.20, 802.1Q or WiMax network. Further, the network 1726 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

Overall, the disclosure substantially facilitates a user in the virtual world, wherein many positions are not possible to achieve for the purposes of navigation, like looking behind while at 180° while sitting on a chair. The user cannot turn his/her neck or back at 180°. For such navigation body, movement is restricted and user has to get up and turn backward. With the disclosure, the user is able to use a handheld device such as stylus to navigate to backside where physical movement is not possible.

In the virtual world, navigation using hand/body gestures requires lots of movement. The present subject matter minimizes the movements by using stylus to navigate. With navigation using stylus user is able to navigate just by rotating the stylus in different directions, and does not have to wave hands continuously or move around from one place to another, as otherwise required by the current method of navigation.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A method by a first device, the method comprising:
pairing, by a transceiver of the first device, the first device with a second device via a wireless medium;
based on the pairing of the first device with the second device, displaying, by the first device, a first view of virtual content, wherein a current position of the second device when pairing with the first device is determined as an initial position of the second device;
in response to pairing of the first device with the second device, determining an alignment of the second device in its initial position;
mapping the alignment of the second device to the first view of the virtual content;
while displaying the first view of the virtual content, receiving, by the transceiver, movement data of the second device through the wireless medium;
based on the movement data, obtaining, by at least one processor of the first device, at least one of direction information or rotation information;
based on comparing magnitudes of the movement data of the second device with a threshold value, identifying whether the movement data comprises a first category command or a second category command;
in response to identifying the movement data as comprising the first category command, performing, by the at least one processor, navigation from the first view of the virtual content to a second view of the virtual content and displaying, by the first device, the second view of the virtual content, the second view corresponding to the obtained at least one of the direction information or the rotation information; and
in response to identifying the movement data as comprising the second category command, performing, by the at least one processor, a continuous 360 degree scrolling navigation from the first view of the virtual content, in a direction in a three-dimensional (3D) space and displaying, by the first device, the continuous 360 degree scrolling navigation from the first view of the virtual content.

2. The method of claim 1, wherein the virtual content comprises at least one of 360 degree video content, 3D content, or panoramic content.

3. The method of claim 1, wherein the second device comprises at least one of a stylus, an electronic pen, or a controller.

4. The method of claim 1,
wherein the movement data comprises data sensed by at least one sensor of the second device, and
wherein the at least one sensor comprises at least one of an accelerometer, a motion-sensor, a gyroscope, a gravity sensor, a rotation sensor, or a magnetometer.

5. The method of claim 1, wherein the movement data comprises data corresponding to at least one of:
rotation along an axis of a coordinate system,
rotation within at least one plane of the coordinate system,
rotation in the 3D space,
motion along the axis of the coordinate system,
motion within the at least one plane of the coordinate system, or
motion in the 3D space.

6. The method of claim 1, further comprising, based on the movement data exceeding a first threshold value, or based on the movement data being below a second threshold value, refraining from using the movement data.

7. A first device, comprising:
a display;
a transceiver; and
at least one processor configured to:
pair, via the transceiver, the first device with a second device via a wireless medium,
based on the pairing of the first device with the second device, control the display to display a first view of virtual content, wherein a current position of the second device when pairing with the first device is determined as an initial position of the second device,
based on the pairing of the first device with the second device, determining an alignment of the second device in its initial position,
mapping the alignment of the second device to the first view of the virtual content,
while displaying the first view of the virtual content, receive, via the transceiver through the wireless medium, movement data of the second device,
based on the movement data, obtain at least one of direction information or rotation information,
based on comparing magnitudes of the movement data of the second device with a threshold value, identify whether the movement data comprises a first category command or a second category command,
in response to identifying the movement data as comprising the first category command, perform navigation from the first view of the virtual content to a second view of the virtual content and display the second view of the virtual content, the second view corresponding to the obtained at least one of the direction information or the rotation information in the virtual content, and
in response to identifying the movement data as comprising the second category command, perform a continuous 360 degree scrolling navigation from the first view of the virtual content in a direction in a three-dimensional (3D) space and control the display to display the continuous 360 degree scrolling navigation from the first view of the virtual content.

8. The first device of claim 7, wherein the virtual content comprises at least one of 360 degree video content, 3D content, or panoramic content.

9. The first device of claim 7, wherein the second device comprises at least one of a stylus, an electronic pen, or a controller.

10. The first device of claim 7,
wherein the movement data comprises data sensed by at least one sensor in the second device, and
wherein the at least one sensor comprises at least one of an accelerometer, a motion-sensor, a gyroscope, a gravity sensor, a rotation sensor, or a magnetometer.

11. The first device of claim 7, wherein the movement data comprises data corresponding to at least one of:
rotation along an axis of a coordinate system,
rotation within at least one plane of the coordinate system,
rotation in the 3D space,
motion along the axis of the coordinate system,
motion within the at least one plane of the coordinate system, or
motion in the 3D space.

12. The first device of claim 7, wherein the at least one processor is further configured to, based on the movement data exceeding a first threshold value, or based on the movement data being below a second threshold value, refrain from using the movement data.

13. The method of claim 1, wherein the mapping comprises up-scaling or down-scaling the obtained at least one of the direction information or the rotation information by a predefined ratio.

14. The first device of claim 7, wherein the at least one processor is further configured to:
map the movement data to the first view of the virtual content displayed on the first device based on up-scaling or down-scaling the obtained at least one of the direction information or the rotation information by a predefined ratio.

* * * * *